(12) United States Patent
Dateki

(10) Patent No.: US 8,059,696 B2
(45) Date of Patent: Nov. 15, 2011

(54) TRANSMITTING DEVICE USING MULTICARRIER TRANSMISSION SYSTEM AND RECEIVING DEVICE

(75) Inventor: Takashi Dateki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1052 days.

(21) Appl. No.: 11/898,568

(22) Filed: Sep. 13, 2007

(65) Prior Publication Data

US 2008/0069200 A1 Mar. 20, 2008

(30) Foreign Application Priority Data

Sep. 19, 2006 (JP) .................................. 2006-252964

(51) Int. Cl.
*H04B 1/00* (2006.01)
(52) U.S. Cl. ........ 375/146; 375/267; 375/299; 370/319; 370/437; 455/452.2; 455/513
(58) Field of Classification Search .................. 375/140, 375/141, 146, 260, 267, 295, 298, 299; 370/319, 370/330, 343, 431, 437, 464, 465, 468, 477, 370/480, 482; 455/450, 152.1, 452.2, 455, 455/512, 513
See application file for complete search history.

(56) References Cited

U.S. PATENT DOCUMENTS

| | | | |
|---|---|---|---|
| 6,122,338 A | 9/2000 | Yamauchi | |
| 6,307,867 B1 * | 10/2001 | Roobol et al. | 370/470 |
| 7,305,011 B2 * | 12/2007 | Shae et al. | 370/487 |
| 2002/0078468 A1 * | 6/2002 | Yazawa | 725/139 |
| 2010/0080142 A1 * | 4/2010 | Jeong et al. | 370/252 |

FOREIGN PATENT DOCUMENTS

| | | |
|---|---|---|
| CN | 1394081 | 1/2003 |
| EP | 1075103 | 2/2001 |
| JP | 08-172418 | 7/1996 |
| JP | 10-105193 | 4/1998 |
| JP | 10-336140 | 12/1998 |
| JP | 2000-244444 | 9/2000 |
| JP | 2004-032604 | 1/2004 |
| JP | 2005-057576 | 3/2005 |
| JP | 2006-074081 | 3/2006 |

OTHER PUBLICATIONS

Japanese Patent Office "Notice of Reason for Rejection" issued for corresponding Japanese Patent Application No. 2006-252964, mailed Oct. 26, 2010. English translation attached.
The State Intellectual Property Office of China First Notification of Office Action for corresponding Chinese Patent Application No. 200710153377.0 issued Feb. 25, 2010 with its translation.

* cited by examiner

*Primary Examiner* — Dac Ha
(74) *Attorney, Agent, or Firm* — Myers Wolin, LLC.

(57) ABSTRACT

A transmitting device includes a setting unit dividing a transmitting frequency bandwidth into frequency blocks each narrower than a receivable bandwidth of a receiving device, and setting a transmission rate in each of the frequency blocks so as to increase or decrease stepwise, and a receiving device receiving signal with the transmission rate being thus set includes a receiving unit receiving the signal in any one of a plurality of receiving segments falling within the transmitting frequency bandwidth, each having the receivable bandwidth and provided so that at least one of the frequency blocks included in each receiving segment is also included in at least one of other receiving segments.

8 Claims, 21 Drawing Sheets

TRANSMITTING DEVICE USING MULTICARRIER TRANSMISSION SYSTEM AND RECEIVING DEVICE

BACKGROUND OF THE INVENTION

1. Field of the Invention

The present invention relates to a transmitting device that transmits the same information such as broadcast information to a plurality of receiving devices by use of a multicarrier transmission system and to the receiving device.

2. Description of the Related Art

Research and development have been progressed for a long time about a technology of transmitting the same broadcast information comprised of image data, voice data, etc as in the case of a TV broadcast, a radio broadcast, etc to a plurality of receiving stations. As to this type of technology, Patent document 1 discloses a technology of efficiently transmitting the broadcast information.

This related art is that a transmitting station generates plural data having different levels-of-detail (levels of data compression) about the same information, and transmits the respective pieces of data via a plurality of transmission channels, separately. FIG. 20 is a diagram showing an example of a transmitting method in this related art, and FIG. 21 is a diagram illustrating an example of information allocation related to the transmitting method in the related art.

In the examples illustrated in FIGS. 20 and 21, the plural data (#1 through #3), (#1 through #6) and (#1 through #9) having the different levels-of-detail, which comprises the same broadcast information, are generated. To be specific, the respective pieces of data are generated in a way that increases the level-of-detail of the broadcast information in the sequence of (#1 through #3), (#1 through #6) and (#1 through #9) and also increases a data size. Transmission of the data involves employing transmission channels CH1,CH2 and CH3 corresponding to receivable bandwidths of a receiving station, wherein each transmission channel is set to raise a transmission rate in the sequence of CH1, CH2 and CH3. The base station allocates the data to the channels having the lower transmission rate in the sequence from the smallest level-of-detail, and simultaneously transmits the broadcast information.

On the other hand, each receiving station sets the receivable band to any one of the transmission channels CH1, CH2 and CH3 corresponding to the receiving environment of the self-station, and receives the broadcast information that is transmitted from the base station. For example, the receiving station, which is in the good receiving environment, receives the broadcast information via the transmission channel CH3 having the high transmission rate and can therefore receive the broadcast information having the high level-of-detail. Conversely, even the receiving station, which is in the poor receiving environment, can receive the broadcast information via the transmission channel CH1 having the low transmission rate and can therefore receive the broadcast information, though low of the level-of-detail.

Namely, according to the related art, each receiver can receive the same information such as the broadcast information at the transmission rate (the level-of-detail) corresponding to the receiving environment.

The Patent document 1 is a "Japanese Patent Application Laid-Open Publication No. 2004-32604".

In the related art described above, however, N-staged adjustment of the transmission rate entails using N-pieces of transmission channels, and it is required that the same items of information having different levels-of-detail be allocated to the respective channels. In this case, the information (#1 through #3 in FIG. 21) having the minimum level-of-detail is allocated to all of the N-pieces of transmission channels.

Accordingly, if the related art described above takes a scheme enabling the transmission rate to be adjusted in detail at multi-stages, it follows that the information of the low level-of-detail is transmitted via the same number of channels as the number of rate-adjustable stages, resulting in a problem that the frequency usage efficiency declines.

Thus, the related art is, in the communication system of transmitting the same information such as the broadcast information to the plurality of receiving stations, hard to enable the transmission rate to be adjusted at the multi-stages and is disabled to sufficiently improve the transmission efficiency.

SUMMARY OF THE INVENTION

It is an object of the present invention, which was devised in view of the problems given above, to provide a transmitting device enabling a receiving device to flexibly adjust a transmission rate while keeping transmission efficiency when transmitting the same information such as broadcast information and to provide the receiving device.

The present invention adopts the following configurations in order to solve the problems. Namely, according to a first mode of the present invention, a transmitting device comprises a setting unit dividing a transmitting frequency bandwidth into frequency blocks each narrower than a receivable bandwidth of a receiving device, and setting a transmission rate in each of the frequency blocks so as to increase or decrease stepwise.

The setting unit is, for example, unit that modulates subcarriers contained in each frequency block by a modulation method corresponding to the transmission rate, and also unit that codes the data allocated to each of the frequency blocks at a coding rate corresponding to the transmission rate. The setting unit, if capable of thus setting the transmission rate, does not limit a method thereof.

A receiving device receiving signals with the transmission rate being thus set, may be configured to include a receiving unit receiving the signal in any one of a plurality of receiving segments each falling within the transmitting frequency bandwidth, each having the receivable bandwidth and provided so that at least one of the frequency blocks included in each receiving segment is also included in at least one of other receiving segments.

With this configuration, the receiving device can adjust the transmission rate in a segment of the frequency band narrower than the receivable bandwidth.

Further, a transmitting device according to the first mode of the present invention may further comprise an allocating unit allocating data to each of the frequency blocks so that the data received in each of the receiving segments provided by the receiving device described above becomes the same items of information having different levels-of-detail.

With this configuration, the receiving device gets enabled to receive the same information such as the broadcast information at the transmission rate (the level-of-detail) corresponding to the receiving environment in a way that switches over each receiving segment corresponding to, e.g., the receiving environment.

Still further, the plurality of receiving segments of the receiving device is provided so that at least one of the frequency blocks included in each receiving segment is also included in at least one of other receiving segments, and hence a configuration is such that one or more frequency blocks included in each of the receiving segments are overlapped with one or more other receiving segments. The allocating unit nevertheless allocates the data so that the data received in the respective receiving segments become the same items of information each having the different level-of-detail.

Therefore, according to the present invention, though capable of flexibly adjusting the transmission rate, it does not happen that the same data is allocated with an overlap to all of the receiving segments, and hence redundancy to repeatedly transmit the same information does not increase as compared with the related art.

Yet further, a transmitting device according to the first mode of the present invention may further comprise a generating unit generating plural data forming broadcast information simultaneously transmitted to a plurality of receiving devices and having different levels-of-detail, wherein the allocating unit may allocate the data to the frequency blocks having lower transmission rate in the sequence from the data having the lowest level-of-detail in the plural data generated by the generating unit, and may allocate the data allocated to the frequency block included in the receiving segment having the multiple frequency blocks having the lower transmission rate in the plurality of receiving segments, to the frequency block included in each of other respective receiving segments.

Moreover, a transmitting device according to a second mode of the present invention may further comprise, in addition to the first mode of the present invention, a channel allocation unit determining allocation of a plurality of channels within the transmitting frequency bandwidth so that each channel is allocated to at least one of the frequency blocks and the channel allocation within the receivable bandwidth is repeated, wherein the setting unit sets the transmission rate in each of the frequency blocks so as to increase or decrease stepwise with respect to at least one of the plurality of channels.

Namely, according to the second mode of the present invention, even in the case of transmitting the signals multiplexed with the plurality of channels (plural categories of information), the transmission rate of the plural channels can be simultaneously adjusted by changing the receiving segments. Note that if the plurality of channels includes the channel for transmitting the data having no necessity of changing the transmission rate (the level-of-detail), it is also possible not to increase or decrease the transmission rate stepwise with respect to this channel.

It should be noted that the present invention can be realized as a transmitting method having the same features as of the transmitting device according to the present invention, a program making an information processing device (computer) function as the transmitting device, or a recording medium recorded with the program.

According to the present invention, it is feasible to provide the transmitting device enabling the receiving device to flexibly adjust the transmission rate while keeping the transmission efficiency when transmitting the same information such as broadcast information and to provide the receiving device.

DESCRIPTION OF THE PREFERRED EMBODIMENTS

An OFDM (Orthogonal Frequency Division Multiplexing) communication system according to an embodiment of the present invention will hereinafter be described with reference to the drawings. It should be noted that configurations in the following embodiments are exemplifications, and the present invention is not limited to the configurations in the embodiments. The present embodiment will exemplify, as a communication system, a communication system using the OFDM system, however, the present invention is not limited to this communication system.

First Embodiment

An OFDM communication system in a first embodiment of the present invention will hereinafter be described.

[System Architecture]

Figure 1:
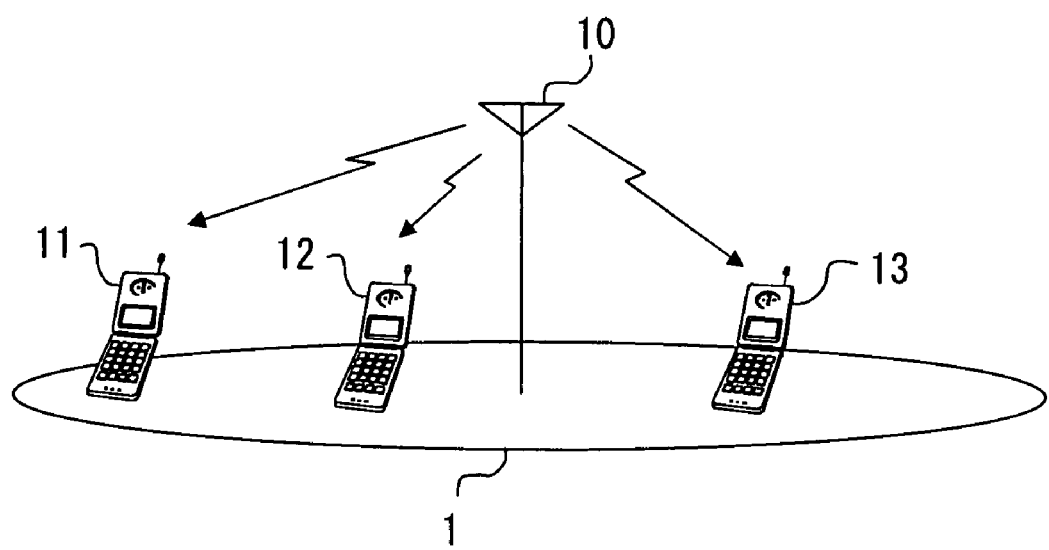
FIG. 1 is a diagram showing an example of a system architecture of an OFDM communication system in a first embodiment.

To begin with, a system architecture of the OFDM communication system in the first embodiment will be explained with reference to FIG. 1. FIG. 1 is a view showing an example of the system architecture of the OFDM communication system in the first embodiment.

The OFDM communication system in the first embodiment includes an information distributing station (unillustrated), a base station 10, and mobile terminals 11, 12, 13, etc. The information distributing station distributes information comprised of image data, voice data, etc as in the case of a TV broadcast, a radio broadcast and so on. The present invention does not limit the information distributed from the information distributing station, and such a type of information may be sufficient that the same information is transmitted simultaneously to the plurality of mobile terminals 11, 12, 13 via the base station 10. In the following discussion, the information of such a type that the same information is transmitted simultaneously to the plurality of mobile terminals, is termed "broadcast information". Further, the information distributing station may transmit, as should-be-distributed broadcast information, pieces of hierarchized level-of-detail information about the broadcast information together.

The base station 10 is connected via a cable to the information distributing station, and simultaneously transmits the broadcast information distributed from the information distributing station to the plurality of mobile terminals 11, 12, 13 through wireless communications using the OFDM system.

The mobile terminals 11, 12, 13 receive the broadcast information etc in a predetermined frequency band set to a bandwidth narrower than a transmission frequency band of the base station 10. Hereafter, the frequency band enabling the mobile terminals to receive the broadcast information is referred to as a receivable band. Further, in the following discussion, the mobile terminals 11, 12, 13 respectively have, it may be sufficient, the same function, and hence the mobile terminals shall be generically referred to as the mobile terminal 11 without giving any distinction therebetween unless a required case particularly arises.

[Configuration of Device]

A device configuration of each of the base station 10 and the mobile terminal 11 will be described.

<Base Station>

The base station 10 is comprised, as a hardware configuration, of circuits (IC chips etc) that realize respective function units, which will hereinafter be illustrated. Further, the base station 10 includes a CPU (Central Processing Unit), a memory, input/output interfaces, etc, in which the CPU executes programs stored in the memory, and the respective function units given as below may also be thereby realized.

Figure 2:
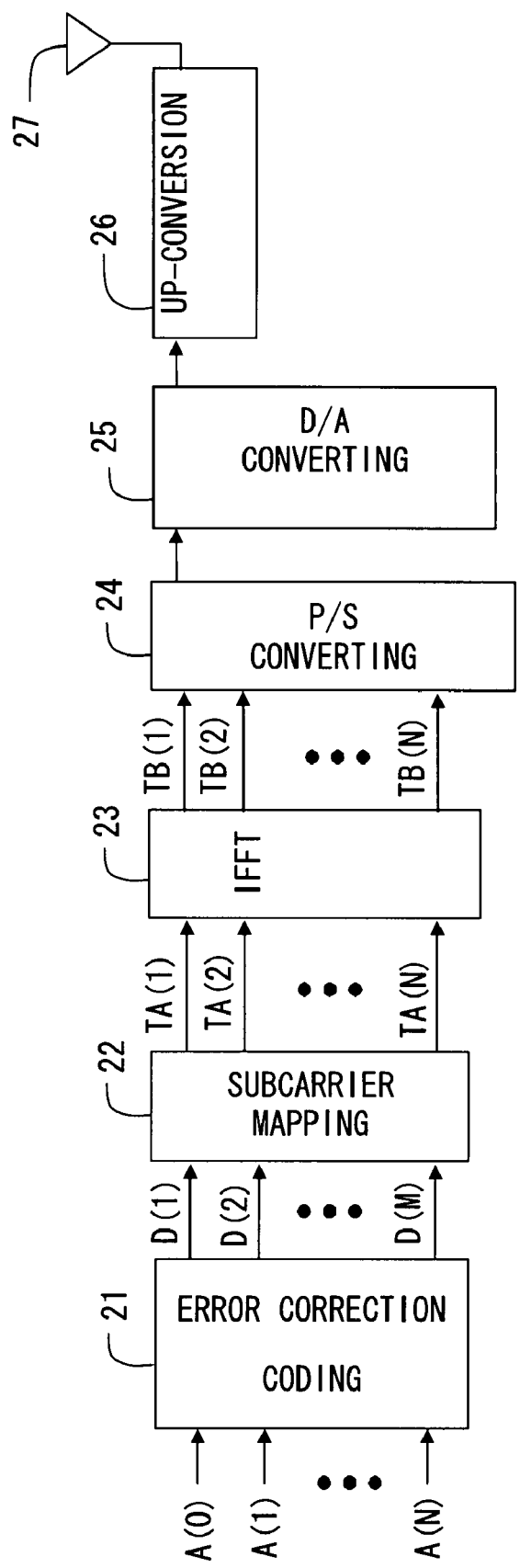
FIG. 2 is a block diagram showing a functional configuration of a transmitting function of a base station in the first embodiment.

A functional configuration of a transmitting function of the base station 10 will be described with reference to FIG. 2. FIG. 2 is a block diagram showing the functional configuration of the transmitting function of the base station in the first embodiment. Note that the functional configuration illustrated in FIG. 2 is an exemplification of the functional configuration of a transmitting device employing the OFDM system, and the present invention is not limited to this type of functional configuration of the transmission. Moreover, the base station 10 in the first embodiment has none of limits to a receiving function and therefore has, it may be sufficient, the receiving function of a general type of base station device.

The base station 10 includes an error correction coding unit 21, a subcarrier mapping unit 22, an Inverse Fast Fourier Transform (which will hereinafter be abbreviated to IFFT) unit 23, a parallel/serial (which will hereinafter be abbreviated to P/S) converting unit 24, a digital/analog (which will hereinafter be abbreviated to D/A) converting unit 25, an up-conversion unit 26, an antenna element 27, etc.

Figure 3:
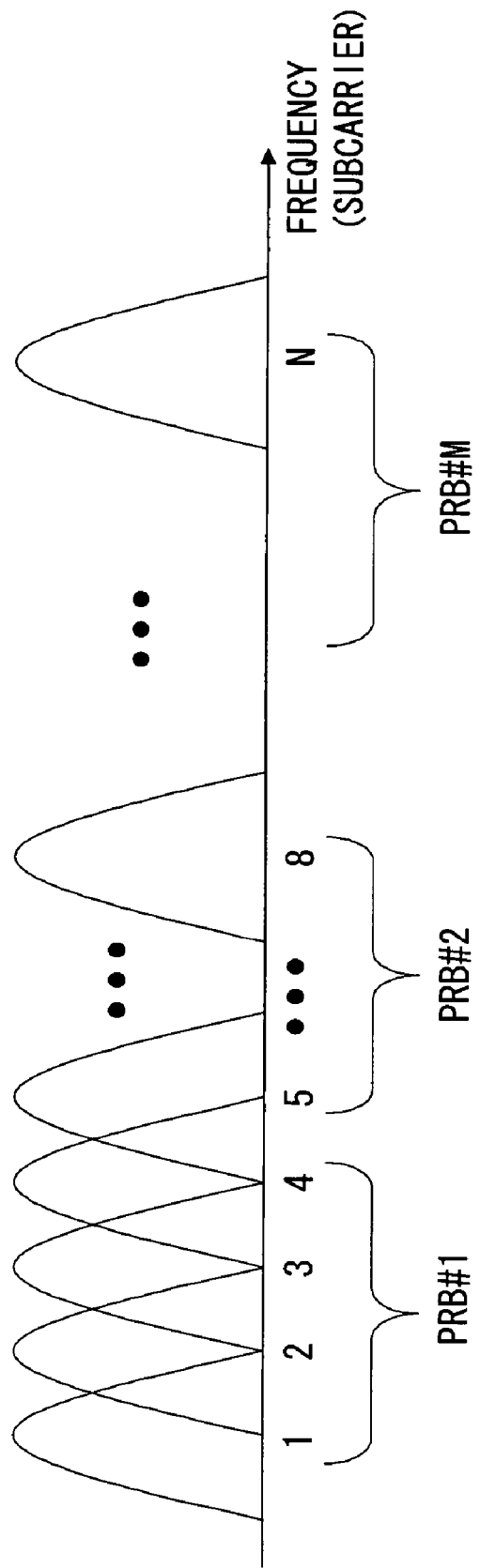
FIG. 3 is a diagram illustrating an OFDM communication system using N-pieces of subcarriers.

Before explaining these functional units, to begin with, an OFDM signal transmitted from the base station 10 will be described. The OFDM system is a system that segments the transmission data into plural data, maps plural pieces of segmented transmission data to a plurality of orthogonal carrier waves (subcarriers), and transmits the data in parallel on the frequency axis. FIG. 3 is a diagram showing the OFDM communication system using N-pieces of subcarriers given as a power of 2.

The following discussion will exemplify a case of using the N-pieces of subcarriers as shown in FIG. 3. Further, some subcarriers of the N-pieces of subcarriers are grouped into a block which shall be called a frequency block (which will hereinafter be also termed PRB), and the present invention involves using a concept of this frequency block (PRB). The example in FIG. 3 is that each PRB consists of four subcarriers, and the N-pieces of subcarriers are grouped into M-pieces of PRBs. In this example, let $\Delta f$ be an interval between the respective PRBs, and an interval of the respective subcarriers becomes $\Delta f$ quarters ($\Delta f/4$).

Figure 4:
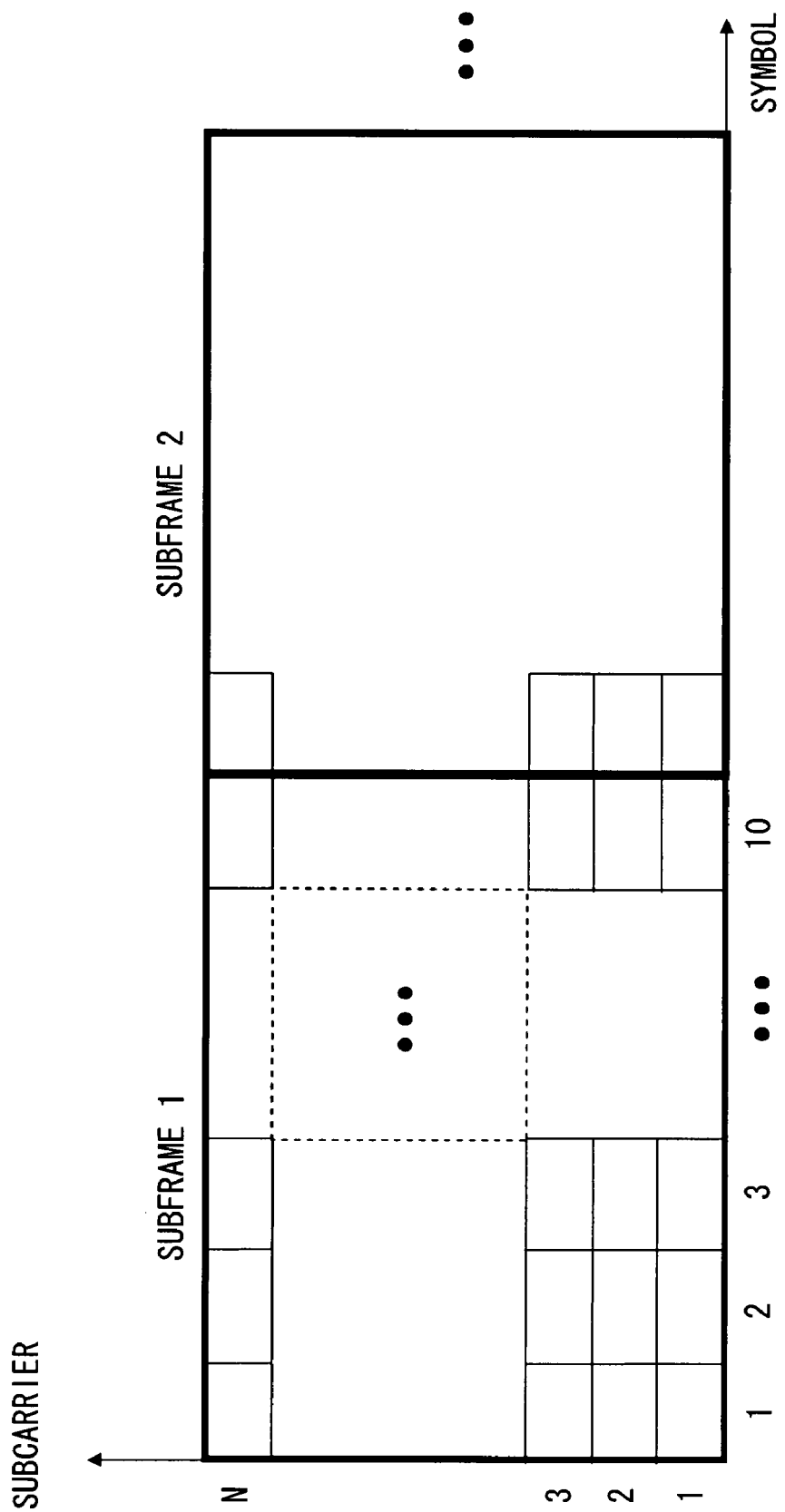
FIG. 4 is a diagram showing an example of an OFDM frame.

FIG. 4 is a diagram showing an example of an OFDM frame. In the first embodiment, N-pieces of input signals are transmitted as carried on the N-pieces of subcarriers in each period of symbol time, and hence the OFDM frame has, as illustrated in FIG. 4, frequency resources given by multiplying N-pieces of subcarriers by time. In the following discussion, the N-pieces of subcarriers for 10-symbol time shall be batchwise called a subframe.

The respective function units of the base station 10 transmitting this type of OFDM signals will be explained.

The error correction coding unit 21 segments and classifies pieces of broadcast information A(0) through A(N) (containing the hierarchized level-of-detail information) sent from the information distributing station. Further, the error correction coding unit 21 encodes the segmented-and-classified data by using an error correction code at a coding rate corresponding to each piece of data. Thus-generated pieces of data D(1) through D(M) are transmitted to the subcarrier mapping unit 22. A specific example of how the broadcast information is segmented and classified by the error correction coding unit 21, will be described later on.

The subcarrier mapping unit 22 maps the data D(1) through the data D(M), which are to be inputted, to the N-pieces of subcarriers. Specifically, the subcarrier mapping unit 22 divides the to-be-inputted data in order to allocate the data to the respective subcarriers, and modulates the divided data by a modulation method (BPSK (Binary Phase Shift Keying), QPSK (Quadrature Phase Shift Keying), 16QAM (Quadrature Amplitude Modulation), etc) corresponding to the frequency block to which the allocation subcarriers belong.

Figure 5:
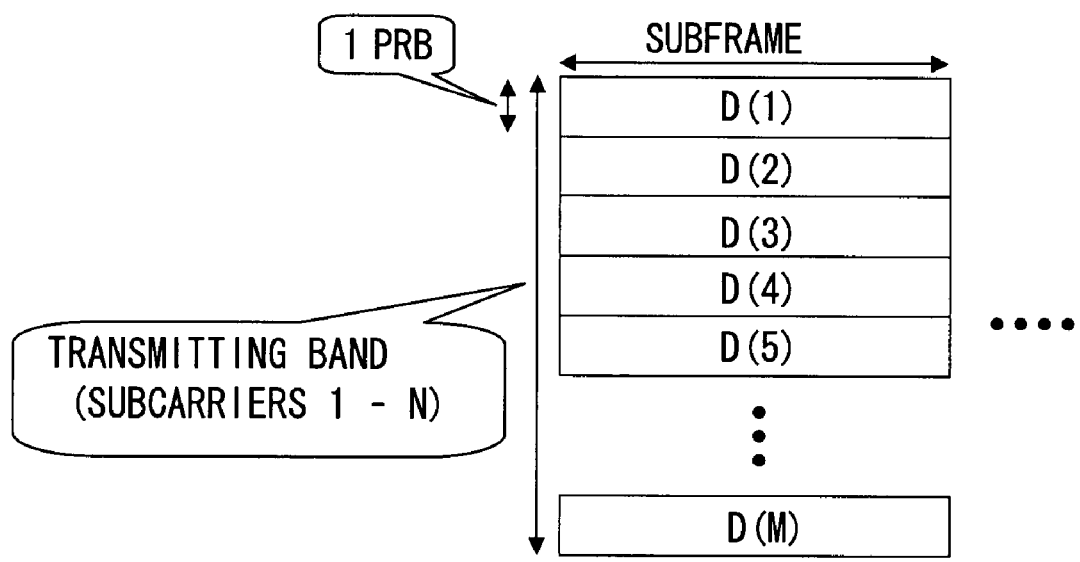
FIG. 5 is a diagram showing an example of subcarrier mapping in the first embodiment.

FIG. 5 is a diagram illustrating an example of the subcarrier mapping in the first embodiment. In the example in FIG. 5, the subcarrier mapping unit 22 performs the subcarrier mapping so that any one piece of data of the data D(1) through the data D(M) is allocated to each frequency block (PRB). Thus-generated modulation signals are respectively output in sequence, in which the N-pieces of modulation signals are transmitted to the IFFT unit 23 in the same symbol time.

The IFFT unit 23 executes an IFFT process about N-pieces of parallel signals TA(1) through TA(N) on an OFDM-symbol-by-OFDM-symbol basis. N-pieces of time domain signals TB(1) through TB(N) generated by the IFFT process are transmitted to the P/S converting unit 24.

The P/S converting unit 24 synthesization-multiplexes the time domain signals TB(1) through TB(N) to be inputted, thereby generating one signal. The generated signal is converted into an analog signal by the D/A converting unit 25.

The thus-converted analog signal, of which a central frequency is converted into a radio transmission frequency by the up-conversion unit 26, is transmitted from the antenna element 27.

<Mobile Terminal>

The mobile terminal 11 is comprised, as a hardware configuration, of circuits (IC chips etc) that realize respective function units, which will hereinafter be illustrated. Further, the mobile terminal 11 includes a CPU (Central Processing Unit), a memory, input/output interfaces, etc, in which the CPU executes programs stored in the memory, and the respective function units given as below may also be thereby realized.

Figure 6:
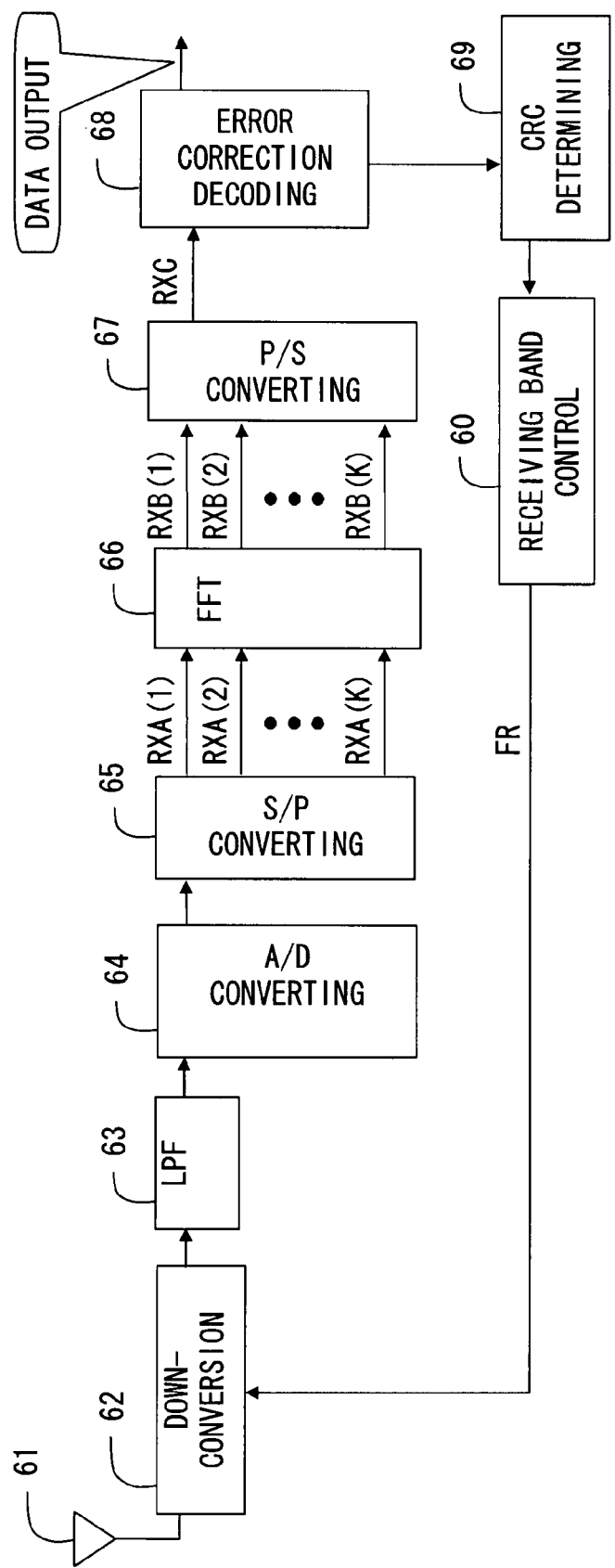
FIG. 6 is a block diagram showing a functional configuration of a receiving function of a mobile terminal in the first embodiment.

A functional configuration of a receiving function of the mobile terminal 11 will hereinafter be explained with reference to FIG. 6. FIG. 6 is a block diagram illustrating the functional configuration of the receiving function of the mobile terminal in the first embodiment. Note that the functional configuration illustrated in FIG. 6 is exemplified as the functional configuration of a receiving device employing the OFDM system, however, the present invention is not limited to this type of functional configuration of the reception. Further, the mobile terminal 11 according to the first embodiment does not limit the transmitting function, and therefore has, it may be sufficient, the transmitting function of a general type of mobile terminal.

The mobile terminal 11 includes, an antenna element 61, a down-conversion unit 62, a lowpass filter (which will hereinafter be abbreviated to LPF) 63, an analog/digital (which will hereinafter be abbreviated to A/D) converting unit 64, a serial/parallel (which will hereinafter be abbreviated to S/P) converting unit 65, a Fast Fourier Transform (which will hereinafter be abbreviated to FFT) unit 66, a P/S converting unit 67, an error correction decoding unit 68, a CRC (Cyclic Redundancy Check) determining unit 69, a receiving band control unit 60, etc.

The down-conversion unit 62 converts the radio frequency signal, which is received by the antenna element 61 and amplified, into a baseband signal. Hereat, the down-conversion unit 62 performs, based on a receiving central frequency FR retained by the memory etc, the conversion so that the frequency FR of the received radio signal becomes 0 hertz (Hz). This receiving central frequency FR becomes a central frequency of the receivable band of the mobile terminal 11. The converted baseband signal is transmitted to the LPF 63.

The LPF 63 removes, from the baseband signals to be inputted, signals outside the predetermined bandwidth (the receivable bandwidth). The predetermined bandwidth is set narrower than a transmitting bandwidth (a frequency bandwidth delimited by the subcarriers 1 through N shown in FIGS. 3 and 4) of the base station 10. Note that a band having the predetermined bandwidth, of which the central frequency is the frequency FR, becomes the receivable band of the mobile terminal. The receivable bandwidth is set equal to a bandwidth equivalent to, e.g., three PRBs. The signals thus subjected to filtering are, after being converted into the digital signals by the A/D converting unit 64, transmitted to the S/P converting unit 65.

The S/P converting unit 65 converts the to-be-inputted digital signals into K-pieces of parallel signals RXA(1)-RXA(K). The symbol "K" corresponds to the number of the subcarriers contained in the receivable band. As in the example of FIG. 3, in a case where the number of the subcarriers contained in 1PRB is "4" and the receivable band is set equivalent to three PRBs, K is given such as K=4×3=12 (subcarriers). Note that guard intervals are removed from the parallel signals at this time.

The FFT unit 66 executes an FFT process about the inputted parallel signals, and outputs K-pieces of frequency domain signals RXB(1)-RXB(K) corresponding to the subcarrier components. These frequency domain signals RXB(1)-RXB(K) are demodulated based on the modulation method executed about the symbol of each subcarrier by an unillustrated function unit. The P/S converting unit 67 rearranges the demodulated signals into a serial data string RXC and transmits the data string RXC to the error correction decoding unit 68.

The error correction decoding unit 68 performs decoding based on an error correction code with respect to the data RXC to be inputted. The decoded data is transmitted to another data processing unit (unillustrated). Further, the decoded data is transmitted to the CRC determining unit 69.

The CRC determining unit 69 determines the error on the basis of the CRC data contained in any plural data of the data D(1) through the data D(M) in the inputted data RXC. Results of the error determination are sequentially sent to the receiving band control unit 60.

The receiving band control unit 60 determines, based on the result of the error determination sent from the CRC determining unit 69, a segment that can be taken as the receivable band (which will hereinafter be also termed a receiving segment), and transmits the determined result to the down-conversion unit 62. A central frequency of the determined receiving segment (a receiving central frequency FR) is sent as the determined result.

Figure 7:
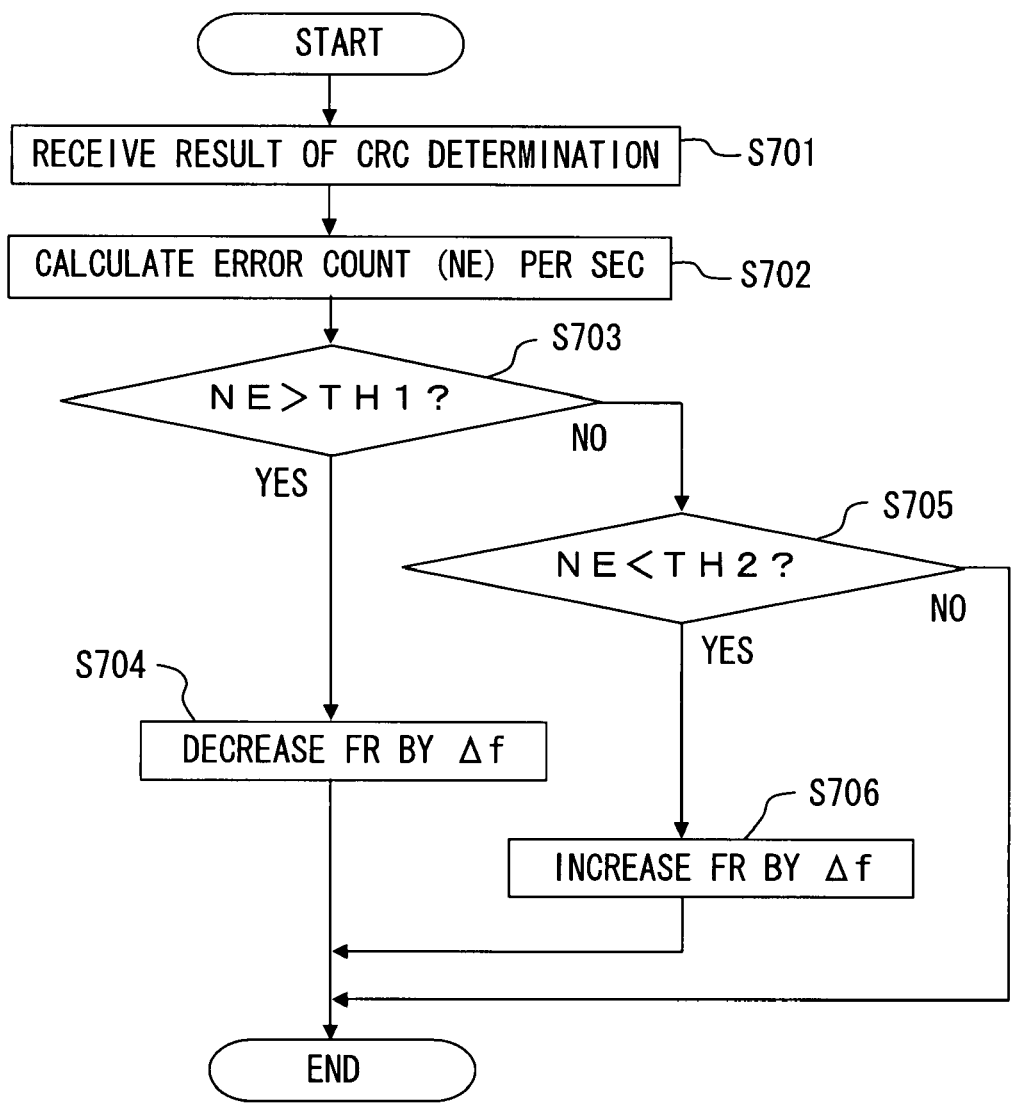
FIG. 7 is a flowchart showing a receiving segment determining process by a receiving band control unit in the first embodiment.

The receiving band control unit 60 determines the receiving segment by a process as shown in FIG. 7. FIG. 7 is a flowchart showing a receiving segment determining process by the receiving band control unit 60. To start with, the receiving band control unit 60 receives the error determination result sent from the CRC determining unit 69 (S701). Subsequently, the receiving band control unit 60 adds up the error determination results, and calculates an error occurrence count NE per predetermined unit time (S702). The predetermined unit time involves setting, e.g., 1 sec. as the time enabling a plurality of subframes to be included.

The receiving band control unit 60 compares the error occurrence count NE with a predetermined upper limit threshold value TH1 that is beforehand retained adjustably in the memory etc (S703). The receiving band control unit 60, when determining that the error occurrence count NE is larger than the upper limit threshold value TH1 (which implies that a receiving environment is poor) (S703; YES), changes the central frequency FR of the receivable band to a receiving segment with the transmission at a lower transmission rate (S704). For example, the receiving band control unit 60, at this time, reduces the central frequency FR by a predetermined frequency Δf that is previously retained adjustably in the memory etc (S704). Moreover, the receiving band control unit 60 may also reduce the central frequency FR by a multiple of Δf, corresponding to a difference between the error occurrence count NE and the upper limit threshold value TH1.

By contrast, the receiving band control unit 60, when determining that the error occurrence count NE is equal to or lower than the upper limit threshold value TH1 (S703; NO), further compares the error occurrence count NE with a predetermined lower limit threshold value TH2 that is adjustably retained beforehand in the memory etc (S705). The receiving band control unit 60, when determining that the error occurrence count NE is smaller than the lower limit threshold value TH2 (which implies a case of the preferable receiving environment) (S705; YES), changes the central frequency of the receivable band to a receiving segment with the transmission at a higher transmission rate (S706). For example, hereat, the receiving band control unit 60 increases the central frequency FR by a predetermined frequency Δf that is previously retained in the adjustable manner in the memory etc (S706). Further, the receiving band control unit 60 may also increase the central frequency FR by a multiple of Δf, corresponding to a difference between the error occurrence count NE and the lower limit threshold value TH2.

It is to be noted that a receiving environment estimation method in the receiving band control unit 60 is not limited to the scheme that estimates the receiving environment according to the error occurrence count based on the CRC determination described above, and the receiving environment may also be estimated in accordance with signal power of the receiving signal, SIR (Signal-to-Interference Ratio), etc. The present invention does not restrict the method of selecting the receivable band in the mobile terminal 11.

[Transmission Rate of Transmitting Signal and Information Allocation]

Figure 8:
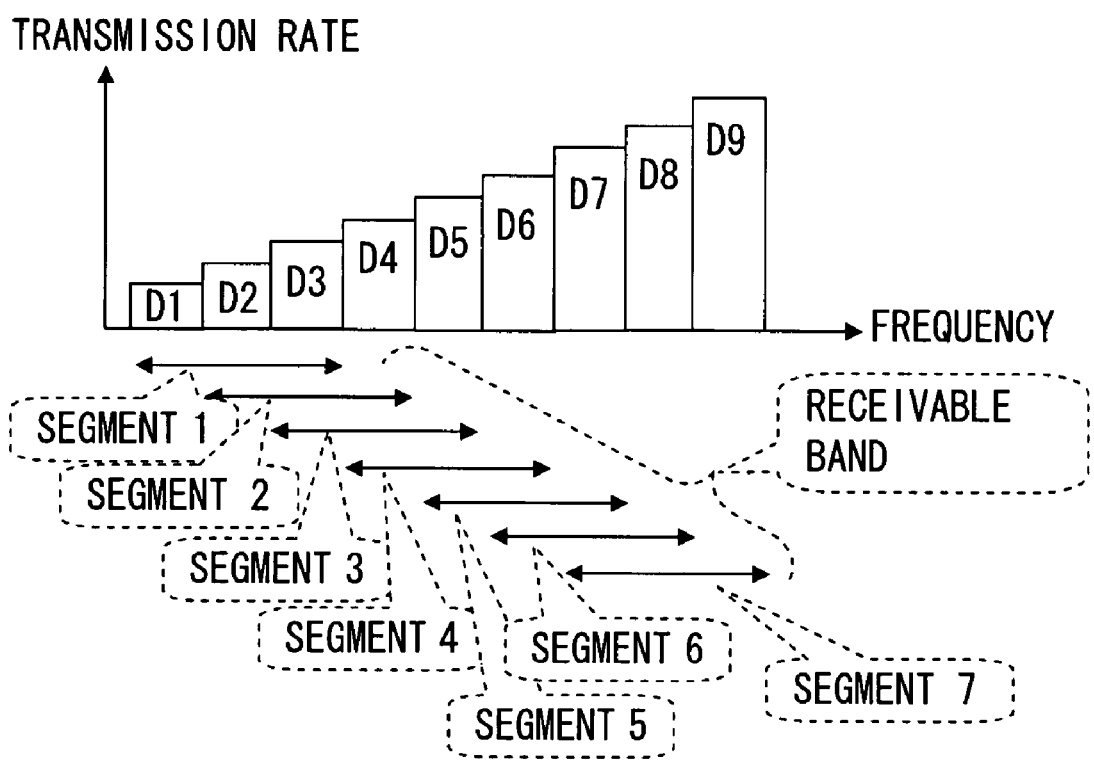
FIG. 8 is a diagram showing an example of information allocation in the first embodiment.
Figure 9:
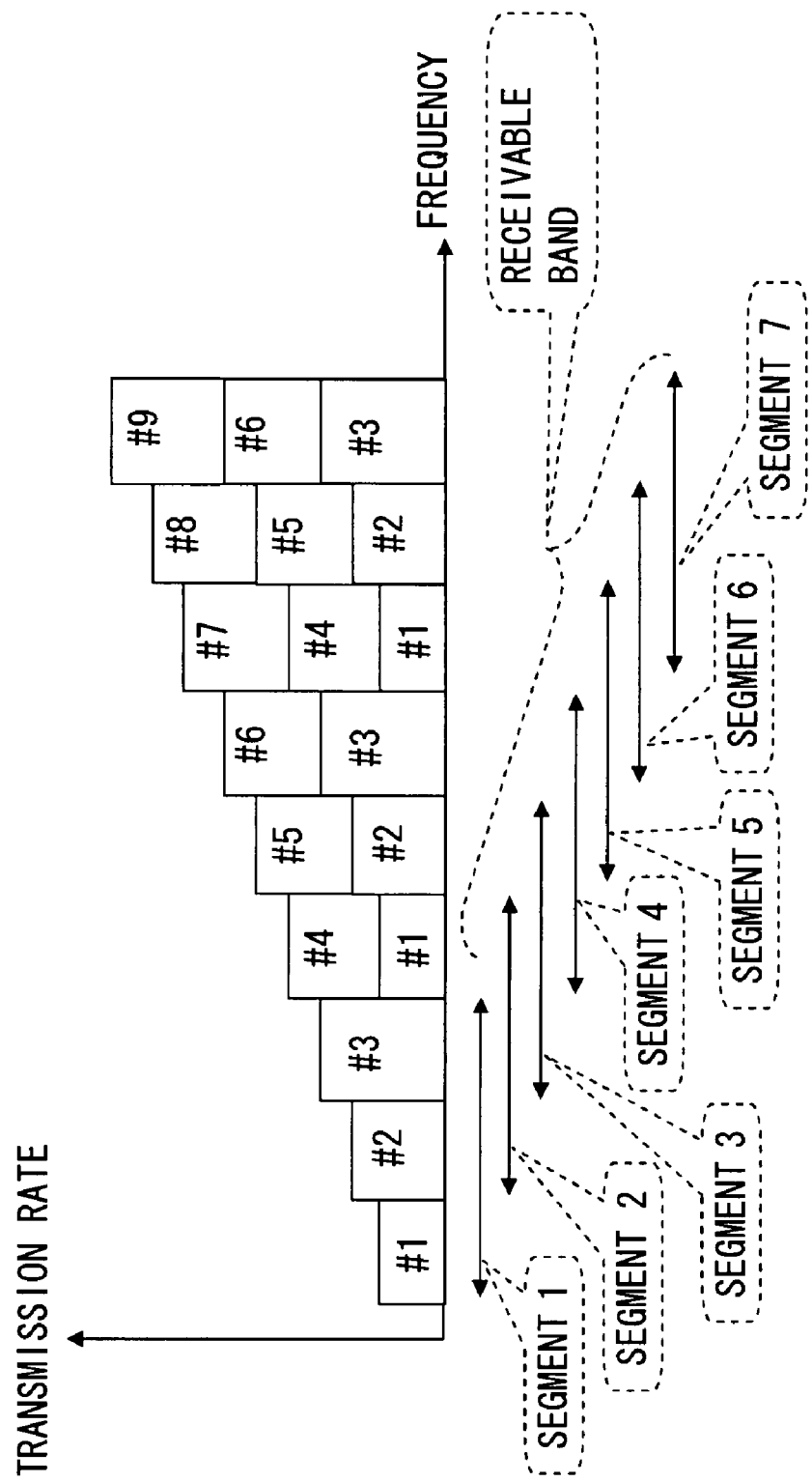
FIG. 9 is a diagram showing an example of an in-depth structure of pieces of data D(1) through D(9)

A transmission rate of the signal transmitted from the base station 10 and a structure of how the information is allocated, will hereinafter be described with reference to FIGS. 8 and 9. FIG. 8 is a diagram showing an example of the information allocation in the first embodiment. FIG. 9 is a diagram illustrating an example of an in-depth structure of the data D(1) through the data D(9) in the example of FIG. 8.

Figure 21:
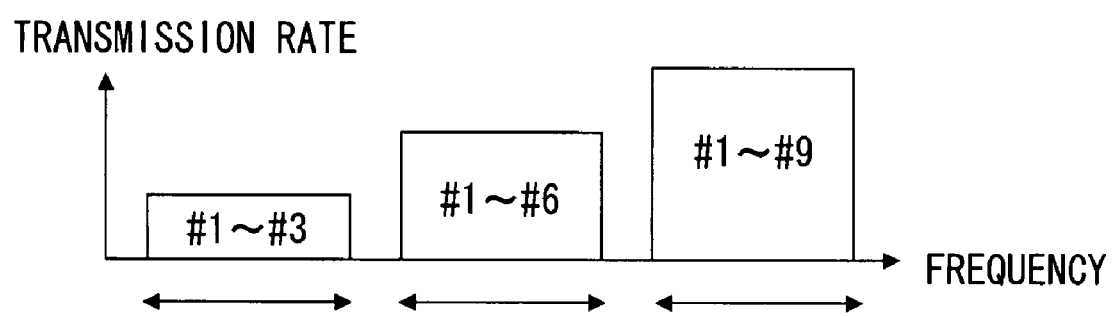
FIG. 21 is a diagram showing an example of the information allocation by a transmitting method in the related art.

As to the signals transmitted from the base station 10, pieces of broadcast information, which should be distributed to the plurality of mobile terminals 11, are allocated as in, e.g., FIG. 8. In the example of FIG. 8, for facilitating a comparison with the related art illustrated in FIG. 21, a bandwidth, which is one thirds (⅓) the transmitting bandwidth in the base station 10, is set as the receivable bandwidth to the mobile terminal.

In this case, a scheme is that the transmitting band comprised of the N-pieces of subcarriers in the base station 10 is divided into nine PRBs narrower than the receivable bandwidth (⅓ of the transmitting bandwidth) to the mobile terminal, and the transmission rate of each PRB increases to a greater degree as the frequency of the PRB gets higher. The transmission rate is given based on the coding rate in the error correction coding unit 21 and the modulation method in the subcarrier mapping unit 22.

At this time, the data receivable in the respective segments (the receiving segments 1 through 7), which can be taken by the receivable band of the mobile terminal, is comprised of the data D(1) through the data D(9) so as to become the same broadcast information. To be specific, the example of FIG. 8 shows that a data set consisting of D(1), D(2) and D(3), data set consisting of D(2), D(3) and D(4), data set consisting of D(3), D(4) and D(5), data set consisting of D(4), D(5) and D(6), data set consisting of D(5), D(6) and D(7), data set consisting of D(6), D(7) and D(8), and data set consisting of D(7), D(8) and D(9) are the same broadcast information, respectively, in which these data set are comprised so as to provide a higher level-of-detail in sequence.

The example of the in-depth structure of pieces of data D allocated to the respective PRBs as described above, will hereinafter be explained with reference to FIG. 9. In FIG. 9, [# (numerical value)] represents real data allocated to each piece of data D, and pieces of real data #1-#9 are additional information for raising the level-of-detail of the same broadcast information. The example in FIG. 9 shows that the respective pieces of real data are allocated to the data D(1) through the data D(9) as follows. The real data is allocated by the error correction coding unit 21 of the base station 10.

Data D(1): Real data #1
Data D(2): Real data #2
Data D(3): Real data #3
Data D(4): Real data #1, #4
Data D(5): Real data #2, #5
Data D(6): Real data #3, #6
Data D(7): Real data #1, #4, #7
Data D(8): Real data #2, #5, #8
Data D(9): Real data #3, #6, #9

According to this example, the data received in the respective receiving segments 1 through 7 in the mobile terminal 11 is given as below.

Receiving segment 1: Real data #1, #2, #3
Receiving segment 2: Real data #1, #2, #3, #4
Receiving segment 3: Real data #1, #2, #3, #4, #5
Receiving segment 4: Real data #1, #2, #3, #4, #5, #6
Receiving segment 5: Real data #1, #2, #3, #4, #5, #6, #7
Receiving segment 6: Real data #1, #2, #3, #4, #5, #6, #7, #8,
Receiving segment 7: Real data #1, #2, #3, #4, #5, #6, #7, #8, #9

At this time, the real data is the additional information for raising the level-of-detail, the information received in the receiving segment 1 of the mobile terminal 11 has therefore the minimum level-of-detail, the level-of-detail of the information received rises gradually in the sequence of the receiving segments, 2, 3, 4, 5, 6, and the information received in the receiving segment 7 has the maximum level-of-detail. Moreover, a scheme is that the information (the data D) having the higher level-of-detail (larger data size) is transmitted at a higher transmission rate.

With this scheme, the mobile terminal 11 goes on changing the receiving segment on the PRB-by-PRB basis and can thereby receive the information having gradually the higher level-of-detail (the larger data size). As compared with the three segments that can be taken by the receivable band in the related art illustrated in FIG. 21, the segments, which can be taken by the receivable band of the mobile terminal 11 in the first embodiment, are seven segments, and, according to the first embodiment, the transmission rate can be flexibly adjusted.

Furthermore, according to the first embodiment, though the transmission rate can be flexibly adjusted, redundancy of repeatedly transmitting the same information does not increase. For example, the pieces of real data #1, #2, #3 defined as the minimum level-of-detail information are transmitted only three times within the whole transmitting band, and the redundancy thereof is the same as by the related art illustrated in FIG. 21.

Note that the scheme in the example of FIG. 9 is that the PRB with the higher frequency has the higher transmission rate, however, another available scheme is that conversely the PRB with the lower frequency has the higher transmission rate.

[Method of Generating Real Data]

Next, an example of a method of generating the real data described above will be explained. The error correction coding unit 21 of the base station 10 allocates, when generating the pieces of data D(1) through D(9) as in the example given above, the pieces of real data #1-#9. Some examples of the generating methods will hereinafter be exemplified, by which the error correction coding unit 21 generates the real data #1 through the real data #9 from the pieces of broadcast information (containing the hierarchized level-of-detail information) A(0) through A(N) sent from the information distributing station.

First Example of Real Data Generating Method

Figure 10:
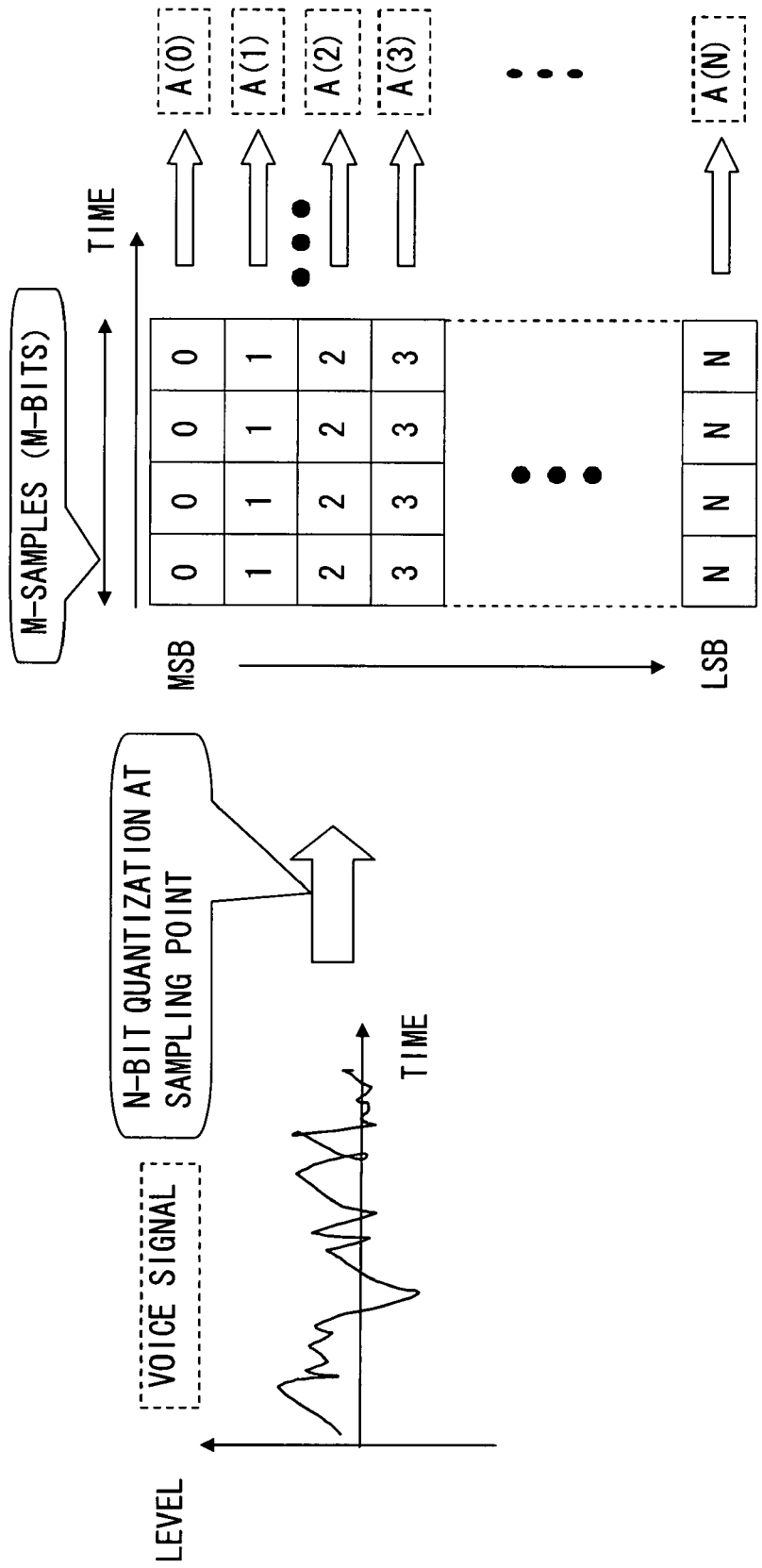
FIG. 10 is a diagram showing a first example of a real data generating method.

A first example of the real data generating method will be described with reference to FIG. 10 in a way that exemplifies a case in which the broadcast information is voice information. FIG. 10 is a diagram showing the first example of the real data generating method.

The information distributing station performs A/D conversion of voice signals shown on the left side in FIG. 10 at a fixed sampling rate, and generates the data A(0) through the data A(N) as shown on the right side in FIG. 10 with respect to the digital values at respective sampling points. Each piece of data A is generated, when the digital value at every sampling point is expressed in binary number, as a value obtained by combining the values of the respective bits by a predetermined number of samples (M-samples in the example of FIG. 10). The data A(0) is the data of the most significant bit (MSB) in the case of expressing the digital value in binary number at each sampling point, and the data A(N) is the data of the least significant bit (LSB). Note that the digital values at the respective sampling points are given along the axis of abscissa on the right side in FIG. 10.

Hereat, in the digital values at the respective sampling points, the data of the upper digits (bits approximate to the MSB) becomes more significant. This is because the information represented by the upper digits is the code information or the information showing a larger fluctuation in amplitude. Accordingly, it follows that the level-of-detail of the voice information changes depending on what degree the lower digits (bits approximate to the LSB) are used to.

The error correction coding unit 21 of the base station 10, when receiving the data A(0) through the data A(N), comprises, for example, the real data in the following manner.

Real data #1: A(1) (M bits)
Real data #2: A(2), A(3) (2M bits)
Real data #3: A(4), A(S), A(6) (3M bits)
Real data #4: A(7), A(8), A(9) (3M bits)
Real data #5: A(10), A(11), A(12) (3M bits)
Real data #6: A(13), A(14), A(15) (3M bits)
Real data #7: A(16), A(17), A(18) (3M bits)
Real data #8: A(19), A(20), A(21) (3M bits)
Real data #9: A(22), A(23), A(24) (3M bits)

These pieces of real data are allocated to within the data D(1) through the data D(9) as shown in FIG. 9. Then, the error correction coding unit 21 encodes the respective pieces of data D by using the error correction code at the following coding rates.

Data D(1): Real data #1: Coding rate R=M(bit/subframe/PRB)
Data D(2): Real data #2: Coding rate R=2M(bit/subframe/PRB)
Data D(3): Real data #3: Coding rate R=3M(bit/subframe/PRB)
Data D(4): Real data #1, #4: Coding rate R=4M(bit/subframe/PRB)
Data D(5): Real data #2, #5: Coding rate R=5M(bit/subframe/PRB)
Data D(6): Real data #3, #6: Coding rate R=6M(bit/subframe/PRB)
Data D(7): Real data #1, #4, #7: Coding rate R=7M(bit/subframe/PRB)
Data D(8): Real data #2, #5, #8: Coding rate R=8M(bit/subframe/PRB)
Data D(9): Real data #3, #6, #9: Coding rate R=9M(bit/subframe/PRB)

Note that the description given above shows that the information distributing station generates the data A(0) through the data A(N) following the block diagram in FIG. 2, however, another available scheme is that the voice data in a different format is transmitted from the information distributing station, and the base station 10 generates the data A(0) through the data A(N). Further, the example given above shows that the transmission rate of each PRB is adjusted based on the coding rate, however, the transmission rate may also be adjusted by switching over the modulation method in combination.

Second Example of Real Data Generating Method

Figure 11:
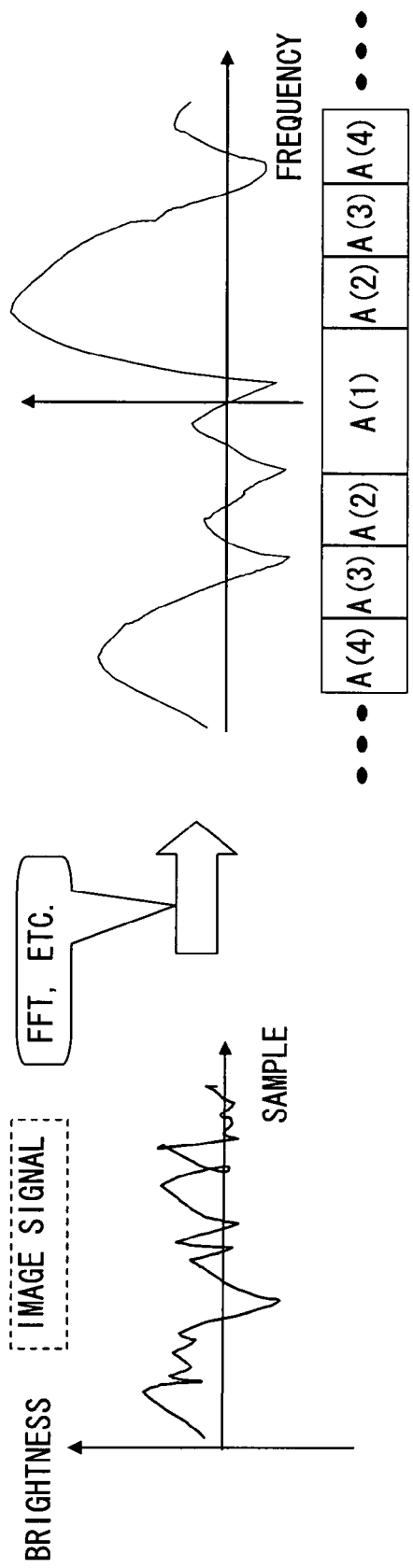
FIG. 11 is a diagram showing a second example of the real data generating method.

A second example of the real data generating method will be explained with reference to FIG. 11 in a way that exemplifies a case in which the broadcast information is image information. FIG. 11 is a diagram showing the second example of the real data generating method.

Image signals are expressed as information about brightness of RGB (Red, Green, Blue) at respective points (N-M samples) on a two-dimensional plane having vertical N-samples and horizontal M-samples. Herein, based on the assumption that processing is the same for the colors R, G, and B and the processing is the same at the respective sampling points of the horizontal M-samples, the following discussion shall deal with the processing for waveforms in coordinates of the N-samples with respect to one arbitrary point of the coordinates on the axis of abscissa, in which the processing is targeted at only one arbitrary color among the colors R, G and B. A graph showing the image signals at this time is illustrated in the left diagram in FIG. 11. Moreover, a graph showing frequency domain signals as a result of computing a FFT of these image signals is illustrated in a right diagram in FIG. 11. The brightness information of the N-samples and each frequency component of the FFT output are expressed by L-bits.

The information distributing station divides the N-samples of the FFT output into blocks per K-samples, wherein KL-bit information of a central part of the divided block is generated as A(1), and pieces of KL-bit information on both sides therefrom are generated as A(2), A(3), A(4) ... in this sequence.

Hereat, the information of A(0) through A(k) is information having broader frequency components as "k" takes a larger value, which is related to the level-of-detail of the image information. If "k" is small, only the components of the narrow frequency band exist, and hence, though capable of expressing gentle variations within an image plane, sharp variations can not be expressed, resulting in a blurred image.

The error correction coding unit 21 of the base station 10, when receiving the data A(0) through the data A(k), comprises, for example, the real data as follows.

Real data #1: A(1)
Real data #2: A(2), A(3)
Real data #3: A(4), A(5), A(6)
Real data #4: A(7), A(8), A(9)
Real data #5: A(10), A(11), A(12)
Real data #6: A(13), A(14), A(15)
Real data #7: A(16), A(17), A(18)
Real data #8: A(19), A(20), A(21)
Real data #9: A(22), A(23), A(24)

The mobile terminal can restore more detailed images by receiving the data A(0) through the data A(k), wherein "k" takes the large value.

Further, the error correction coding unit 21 codes the pieces of thus-structured data D(1) through D(9) in sequence at such a coding rate as to increase the transmission rate.

Third Example of Real Data Generating Method

The real data #1 through the real data #9 in the first and second examples are structured so as to be associated with the levels-of-detail of the broadcast information. The real data may, however, be structured in a way that further includes the additional information as well as being associated with the level-of-detail. For example, the real data may be structured in a way that includes, in addition to the information associated with the levels-of-detail of the pieces of broadcast information such as A(1) through A(6), other items of additional information like character information etc as shown below.

Real data #1: A(1)
Real data #2: A(2), A(3)
Real data #3: A(4), A(5), A(6)
Real data #4: Character information 1
Real data #5: Character information 2
Real data #6: Different viewpoint image information In the case of taking this structure, the mobile terminal in the preferable receiving environment can further receive the additional information.

Operation and Effect in First Embodiment

An operation and an effect of the OFDM communication system in the first embodiment discussed above will hereinafter be described.

In the error correction coding unit 21 of the base station 10, the pieces of broadcast information (containing the hierarchized level-of-detail information) A(0) through A(N) transmitted from the information distributing station are divided and classified by the predetermined method as exemplified by the real data generating method. Further, the divided and classified data is subjected to the error correction coding etc at the coding rate corresponding to each piece of data.

The subcarrier mapping unit 22 performs subcarrier-mapping so that the data D(1) through the data D(M) transferred from the error correction coding unit 21 are allocated to the predetermined PRBs. At this time, the subcarriers are modulated by the modulation method corresponding to the PRB to which the subcarriers belong.

The thus-generated parallel modulation signals are performed the IFFT on the OFDM-symbol-by-OFDM-symbol basis by the IFFT unit 23 and are synthesization-multiplexed by the P/S converting unit 24. Subsequently, these signals are converted into analog signals by the D/A converting unit 25, further converted by the up-conversion unit 26 so that the central frequency of the signal becomes the radio transmission frequency, and are transmitted from the antenna element 27.

In the mobile terminal 11, the radio frequency signals, which are received by the antenna element 61 and amplified, are converted into the baseband signal by the down-conversion unit 62 on the basis of the central frequency FR of the receivable band that is retained in the memory etc.

The baseband signals, of which the signals outside the receivable bandwidth set narrower than the transmitting bandwidth of the base station 10 are removed, are thus converted into the digital signals by the A/D converting unit 64.

The digital signals are converted by the S/P converting unit 65 into K-pieces of parallel signals corresponding to the number of the subcarriers contained in the receivable band, are performed the FFT by the FFT unit 66, then demodulated, and rearranged into the serial data string RXC by the P/S converting unit 67. Finally, the data RXC is decoded by the error correction decoding unit 68 and transmitted to another data processing unit.

On the other hand, the CRC determining unit 69 makes determination of an error on the basis of the CRC data contained in the data RXC. The receiving band control unit 60 determines, based on the result of the determination about the occurrence of the error, the receiving segment, and transmits the central frequency of the determined receiving segment as the central frequency FR to the down-conversion unit 62.

At this time, the receiving band control unit 60, when determining based on the result of the determination of the error that the receiving environment is poor, changes the central frequency of the receivable band to a receiving segment with the transmission at a lower transmission rate, and changes, when determining that the receiving environment is good, the central frequency of the receivable band to a receiving segment with the transmission at a higher transmission rate.

Namely, the base station 10 divides the transmitting band of the broadcast information by the predetermined bandwidth narrower than the receivable bandwidth of the mobile terminal 11, and maps the data to the respective subcarriers included in the divided PRBs so that the pieces of data received in the receiving segments, which can be taken by the mobile terminal 11, become the same sets of broadcast information each having a different level-of-detail. Hereat, the coding rate and the modulation method are adjusted so as to sequentially increase the transmission rates in the PRBs, corresponding to the levels-of-detail of the pieces of information to be allocated.

The mobile terminal 11 has a scheme enabling a plurality of receiving segments different on the PRB-by-PRB basis in the base station 10 and having a predetermined bandwidth to be the receivable band.

With this scheme, the mobile terminal 11 receiving the signals from the base station 10 goes on changing the receiving segments on the PRB-by-PRB basis and can thereby receive the pieces of information gradually having the higher levels-of-detail (the larger data size). Namely, the mobile terminal 11 in the first embodiment can adjust the transmission rate with the higher flexibility.

Moreover, according to the first embodiment, though capable of flexibly adjusting the transmission rate, the base station 10 allocates the broadcast information so as not to increase the redundancy.

Second Embodiment

The OFDM communication system in a second embodiment of the present invention will hereinafter be described. In the OFDM communication system in the first embodiment discussed earlier, such a scheme has been exemplified that the same items of broadcast information A(0) through A(N) are simultaneously transmitted to the plurality of mobile terminals. In the OFDM communication system according to the second embodiment, such a scheme will be exemplified that as in, e.g., a mobile phone system, in the transmitting band, other pieces of information B(1) through B(N) and C are multiplexed and thus transmitted together with the broadcast information A(1) through A(N). Note that the description of the system architecture has none of difference from the first embodiment and is therefore omitted.

[Configuration of Device]

Figure 12:
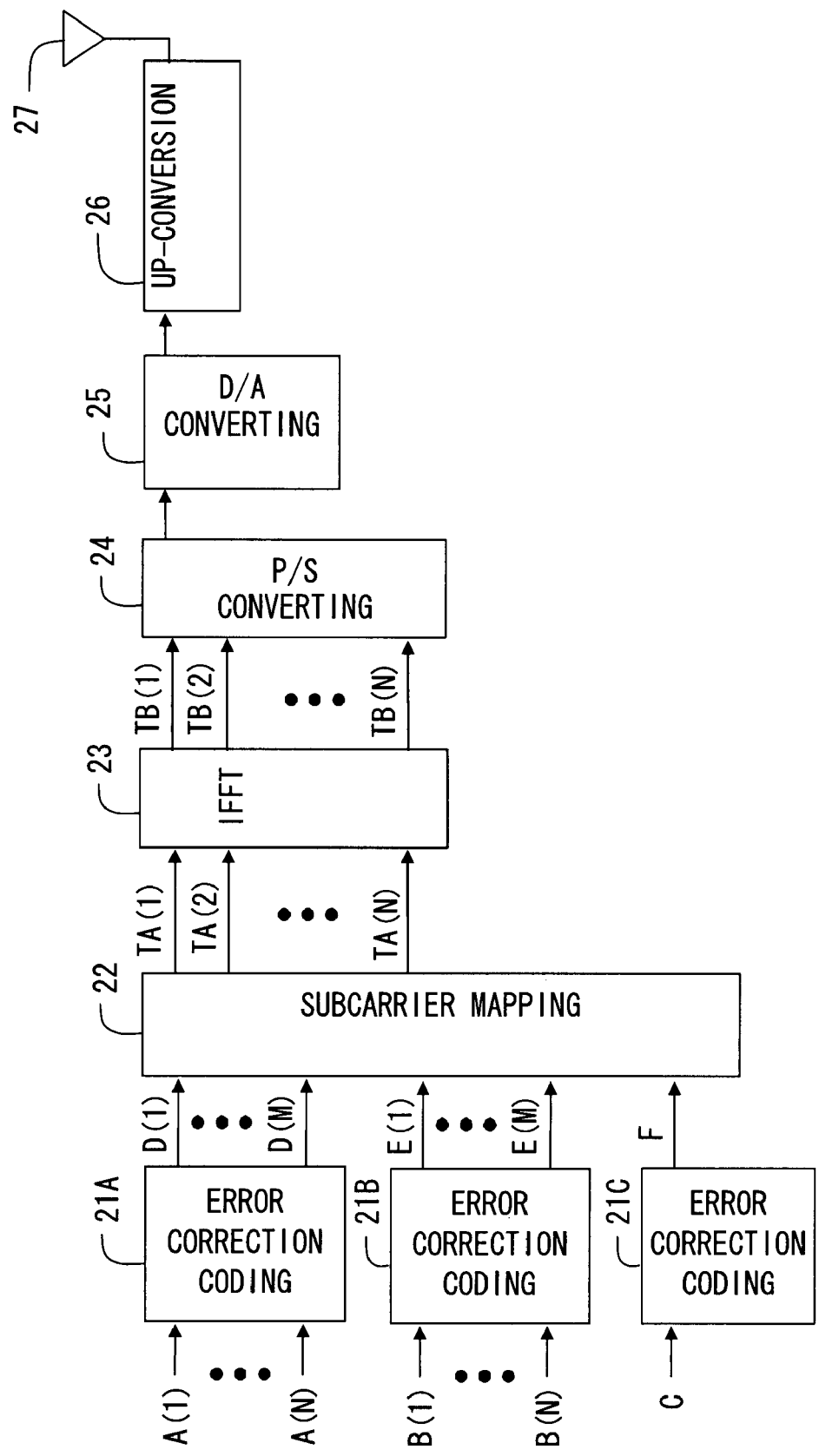
FIG. 12 is a block diagram showing a functional configuration of the transmitting function of the base station in a second embodiment.

The base station 10 in the second embodiment has a different device configuration from that of the base station 10 in the first embodiment in terms of a point that the information to be transmitted increases in the number of types thereof, however, the device configuration of the mobile terminal 11 is the same as in the first embodiment. FIG. 12 is a block diagram illustrating a functional configuration of the transmitting function of the base station 10 in the second embodiment.

The information distributing station (unillustrated) transmits the pieces of broadcast information A(1) through A(N), the pieces of broadcast information B(1) through B(N) and the broadcast information C to the base station 10 in the second embodiment. These pieces of broadcast information are different types of broadcast information, wherein, for example, the broadcast information A is a TV broadcast, the broadcast information B is a radio broadcast, and the broadcast information C is a text broadcasting. The base station 10 in the second embodiment is different from that in the first embodiment in terms of only a point that the base station 10 has error correction coding units 21A, 21B, 21C for the respective types of broadcast information to be multiplexed, and other function units are the same as those in the first embodiment.

The error correction coding units 21A, 21B, 21C divide and classify the data A(1) through the data A(N), the data B(1) through the data B(N) and the data C, corresponding to the types of the broadcast information sent from the information distributing station. The error correction coding units 21A, 21B, 21C perform the error correction coding about the divided-and-classified data at coding rates corresponding to the respective pieces of data, and transmit generated pieces of data D(1) through D(M), data E(1) through E(M) and data F to the subcarrier mapping unit 22.

Figure 13:
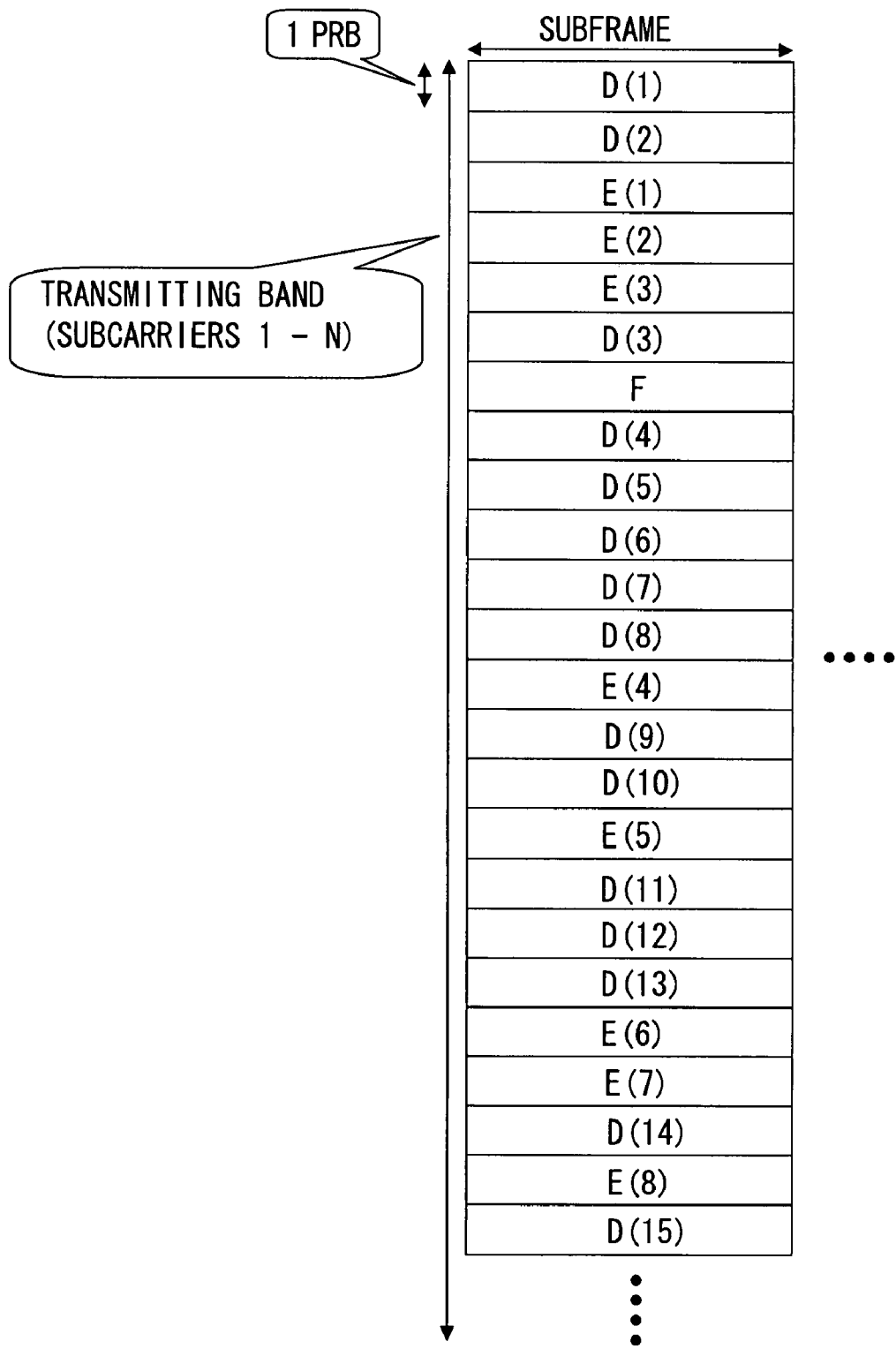
FIG. 13 is a diagram showing an example of the subcarrier mapping in the second embodiment.

The subcarrier mapping unit 22 maps the data D(1) through the data D(M), the data E(1) through the data E(M) and the data F, which are inputted, to the N-pieces of subcarriers. FIG. 13 is a diagram showing an example of the subcarrier mapping in the second embodiment. According to the example of FIG. 13, the subcarrier mapping unit 22 conducts the subcarrier mapping so that any one of the data D(1) through the data D(M), the data E(1) through the data E(M) and the data F is allocated to each frequency block (PRB). At this time, it is desirable to execute multiplexing so that the numbers of the frequency blocks to which the data D, the data E and the data F are allocated, are different from each as in a general case. The thus-generated modulation signals are sequentially output, and N-pieces of signals are transmitted to the IFFT unit 23 in the same symbol-time.

[Transmission Rate of Transmitting Signal and Information Allocation]

Figure 14:
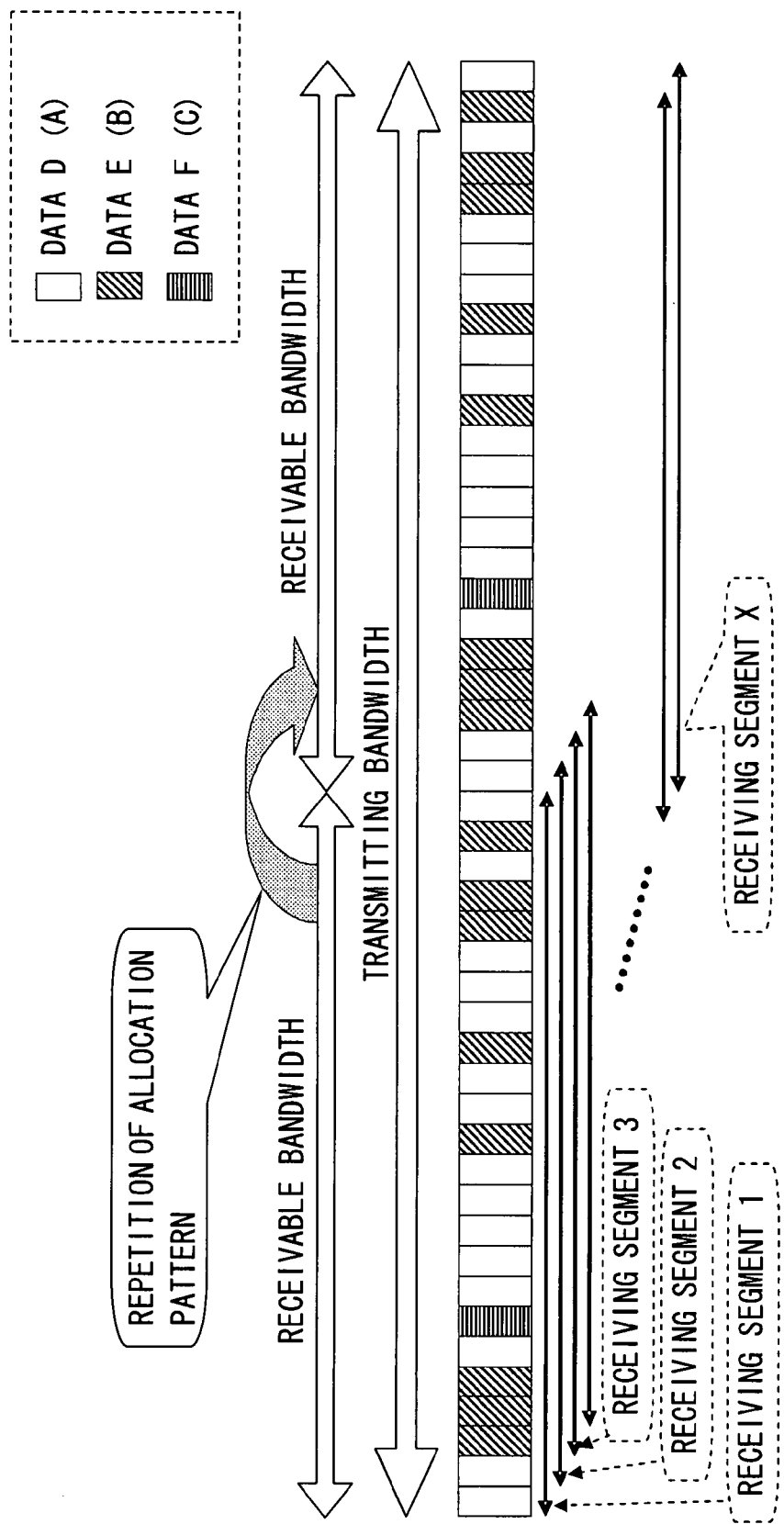
FIG. 14 is a diagram showing a method of determining how information is allocated to frequency blocks in the second embodiment.

In the second embodiment, a transmission rate of the signal transmitted from the base station 10 and a structure of the information to be allocated, will hereinafter be described with reference to FIGS. 14 and 15. FIG. 14 is a diagram illustrating a method of determining how the pieces of information are allocated to the frequency blocks in the second embodiment, and FIG. 15 is a diagram showing an example of the information allocation in the second embodiment.

Figure 15:
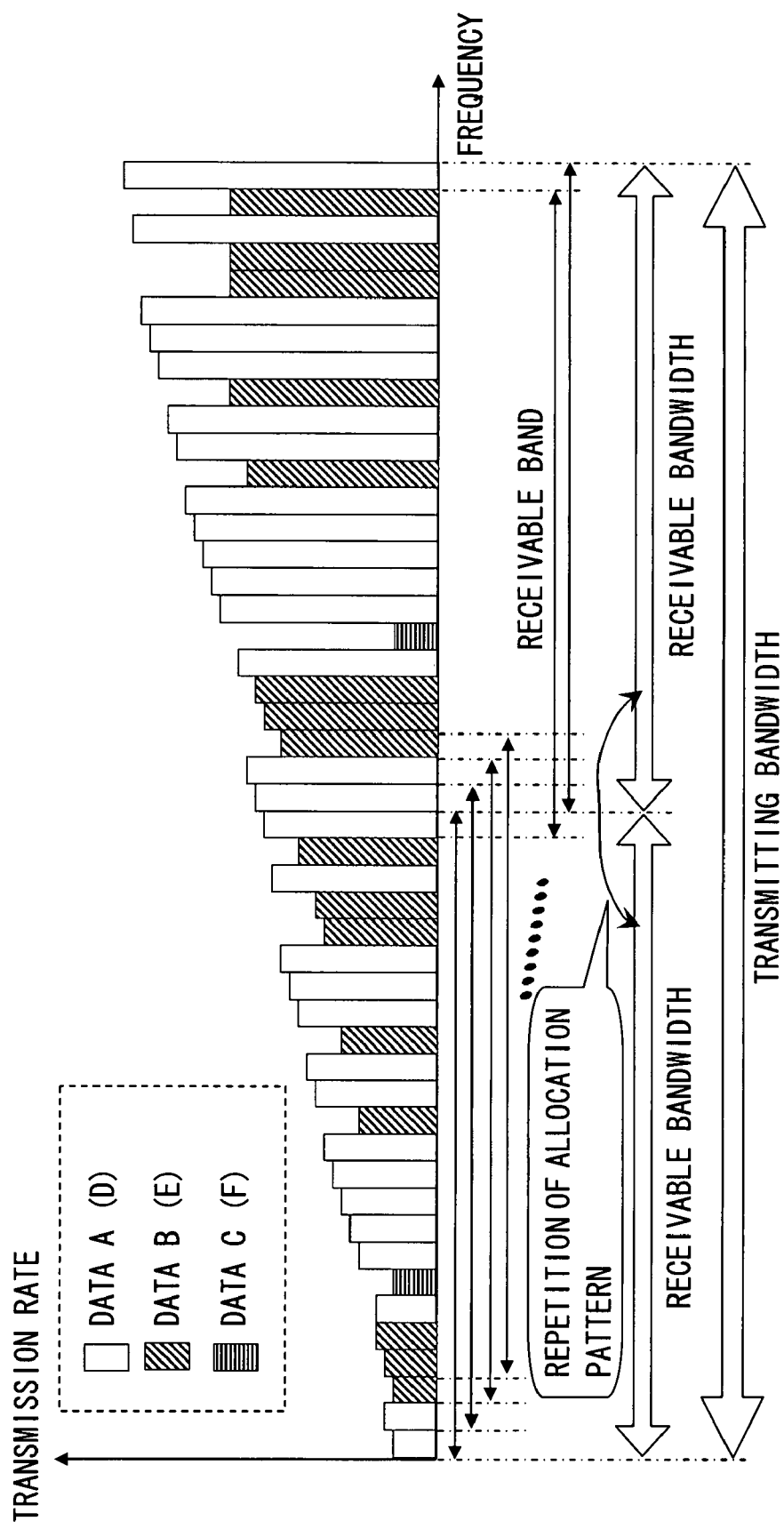
FIG. 15 is a diagram showing an example of the information allocation in the second embodiment.

With respect to the signals transmitted from the base station 10 in the second embodiment, the pieces of broadcast information, which should be distributed to the plurality of mobile terminals 11, are allocated as in, e.g., FIGS. 14 and 15. For facilitating the explanation in the examples of FIGS. 14 and 15, a bandwidth, which is half (½) of the transmitting bandwidth in the base station 10, is set as a receivable bandwidth of the mobile terminal. Then, the base station 10 arbitrarily determines how the respective pieces of information are allocated within the receivable bandwidth of the mobile terminal, and determines the information allocation within the total transmitting bandwidth by repeating the allocation. Hereat, the data D, the data E and the data F are the pieces of data divided and classified based on the different types of broadcast information A, B and C as shown in FIG. 12, wherein the assumption is that the data D(A) is the information having the largest data size (having the highest level-of-detail), the data E(B) is the information having the second largest data size, and the data F(C) is the information having the smallest data size (having the lowest level-of-detail).

The base station 10 in the second embodiment takes this type information allocation, whereby even when the mobile terminal selects any receivable segments, as shown below, it follows that the same number of PRBs, to which the pieces of broadcast information D, E and F are allocated, are included.

Receiving segment 1: D=15 PRBs, E=8 PRBs, F=one PRB

Receiving segment 2: PRB of D(1) is dropped out of the receiving segment 1, and a new PRB of D(16) is added (D=15 PRBs, E=8 PRBs, F=one PRB).

Receiving segment 3: the PRBs of D(1) and D(2) are dropped out of the receiving segment 1, and new PRBs of D(16) and D(17) are added (D=15 PRBs, E=8 PRBs, F=one PRB).

Receiving segment X: 14 PRBs of D are dropped out of the receiving segment 1, 8 PRBs of E are dropped out, one PRB of F is dropped out, new 14 PRBs of D are added, 8 PRBs of E are added, and one PRB of F is added (D=15 PRBs, E=8 PRBs, F=one PRB).

When the information allocation to the PRBs is thus determined, the transmission rates of the PRBs are respectively set so as to increase stepwise as illustrated in FIG. 15. At this time, the data D is structured so as to increase the transmission rate stepwise, however, the data E is the information having a smaller data size than the data D, and hence the transmission rate gets fixed in the predetermined PRB. Further, as to the data F, the whole information can be transmitted via the single PRB having the low transmission rate, and therefore it follows that the transmission rata does not need increasing in the repetitive portion.

Operation and Effect in Second Embodiment

An operation and an effect of the OFDM communication system in the second embodiment discussed above will hereinafter be described. In the OFDM communication system according to the second embodiment, the signals with the plurality of channels (plural types of broadcast information) are multiplexed within the transmitting band are transmitted from the base station 10 to the mobile terminal 11.

In the base station 10, the allocation of the plurality of channels in the transmission frequency band is determined in a way that repeats, in the transmission frequency band, the channel allocation determined with the receivable bandwidth. Then, the channels are allocated on the PRB-by-PRB basis, and each PRB is set so as to increase the transmission rate stepwise.

With this scheme, even when selecting whichever receiving segment in the mobile terminal, it follows that the allocation having the same number of PRBs exists for all of the receiving segments, and the transmission rates of the plural channels can be simultaneously adjusted through the shift of the receiving segment.

Third Embodiment

The OFDM communication system in a third embodiment of the present invention will hereinafter be described. In the OFDM communication system in the second embodiment discussed earlier, such a scheme has been exemplified that the plural types of broadcast information are multiplexed and thus transmitted. The OFDM communication system in the third embodiment will exemplify a scheme of getting user unique information contained in the information to be multiplexed. The user unique information includes, e.g., a speech in voice, an electronic mail, etc. Note that the description of the system architecture has none of difference from the first embodiment and is therefore omitted.

[Configuration of Device]

Device configurations of the base station 10 and of the mobile terminal 11 in the third embodiment will hereinafter be described respectively.

<Base Station>

Figure 16:
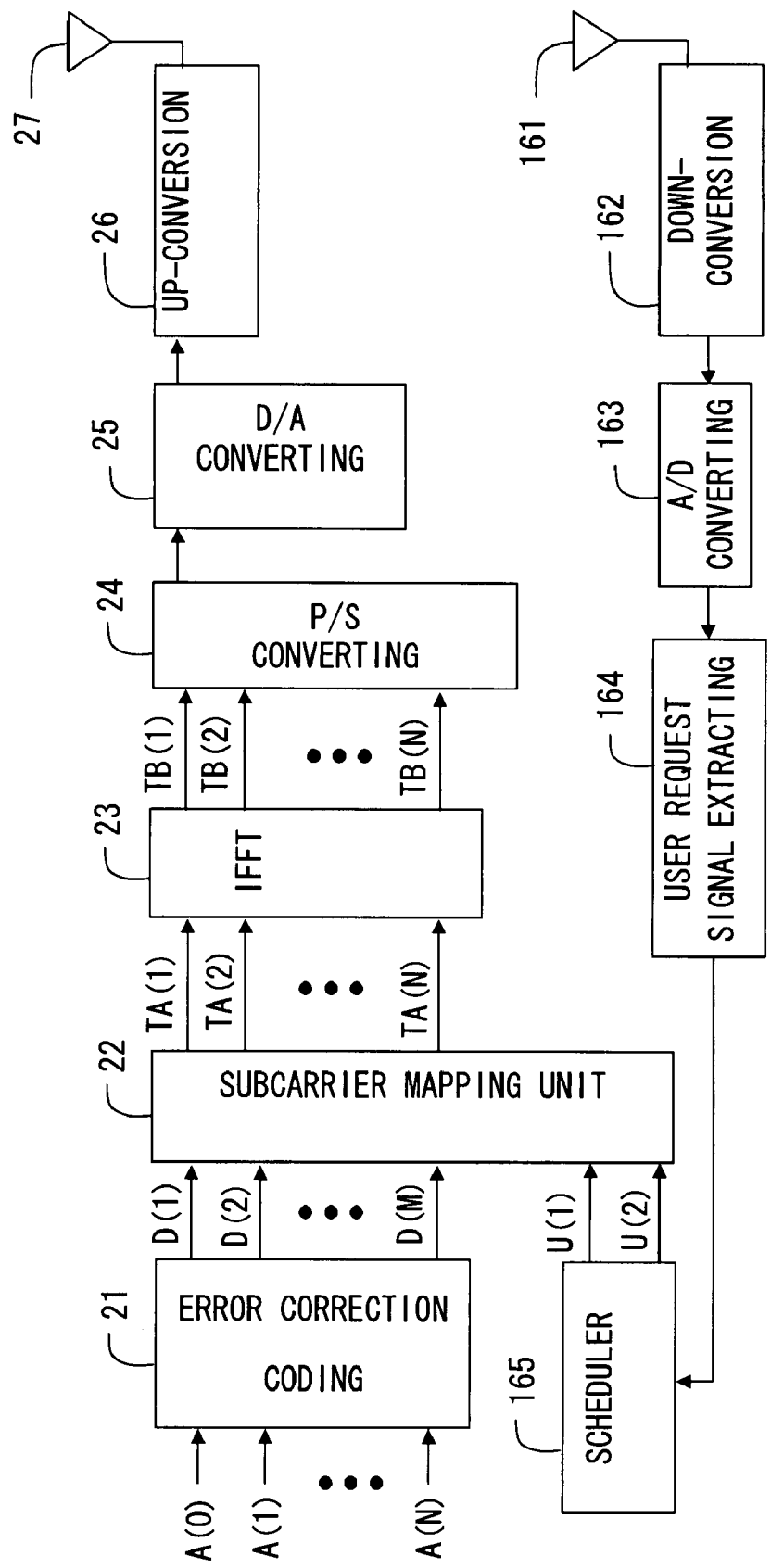
FIG. 16 is a block diagram showing a functional configuration of the base station in a third embodiment.

The base station 10 in the third embodiment has further features about, in addition to those about the transmitting function in the first embodiment, the receiving function of processing the signals sent from the mobile terminal 11. With respect to only the function units different from those in the first embodiment, the functional configuration of the base station 10 in the third embodiment will be explained with reference to FIG. 16. FIG. 16 is a block diagram showing the functional configuration of the base station 10 in the third embodiment.

The base station 10 in the third embodiment further includes, in addition to the functional configuration in the first embodiment, a receiving antenna 161, a down-conversion unit 162, an A/D converting unit 163, a user request signal extracting unit 164, a scheduler 165, etc.

The down-conversion unit 162 converts the radio frequency signals, which are received by the receiving antenna 161 and amplified, into the baseband signals. The radio frequency signals are individual control channel signals assigned to individual users. The A/D converting unit 163 converts the baseband signals into the digital signals and transmits the signals to the user request signal extracting unit 164.

The user request signal extracting unit 164 extracts, from the digital signals, request information specifying which channel, a user dedicated channel U(1) or U(2), user unique information about each mobile terminal is transmitted via. The request information for the user unique information is sent to the scheduler 165.

The scheduler 165 classifies and divides, based on the request information, the user unique information that should be transmitted to the mobile terminals 11, 12 and 13. To be specific, the scheduler 165 performs scheduling so that the user unique information related to each mobile terminal is transmitted via the requested user dedicated channel, and generates pieces of user unique data U(1) and U(2) transmitted via the user dedicated channels. The thus-generated user unique data is transmitted to the subcarrier mapping unit 22.

Figure 17:
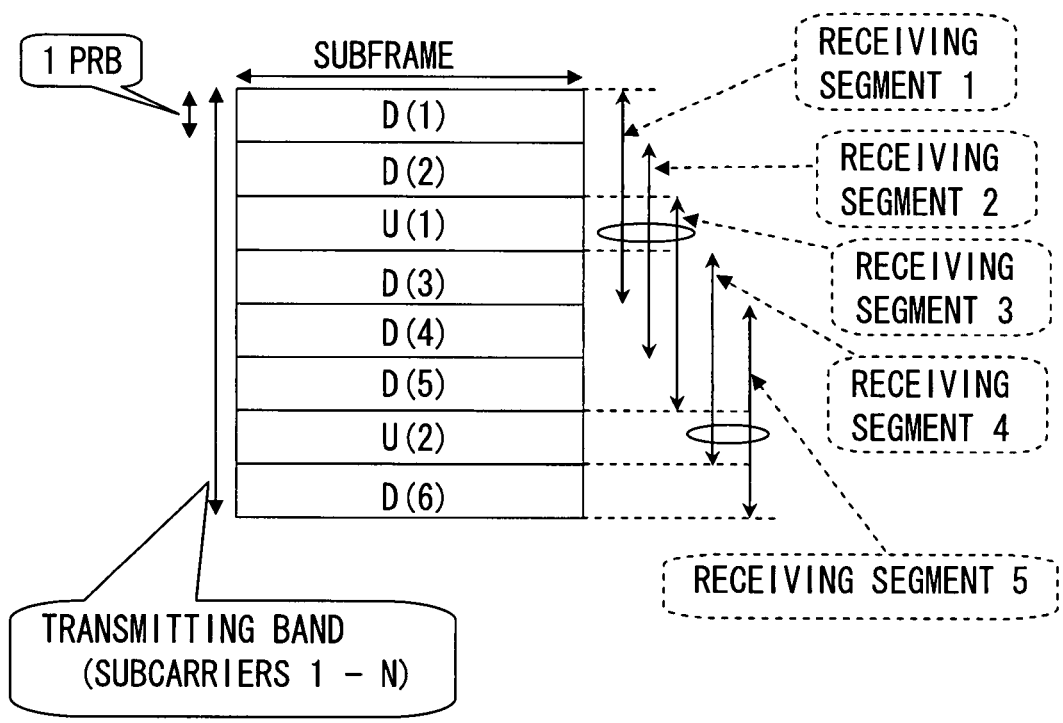
FIG. 17 is a diagram showing an example of the subcarrier mapping in the third embodiment.

The subcarrier mapping unit 22 in the third embodiment maps, in addition to the pieces of data D(1) through D(M) organizing the broadcast information in the first embodiment, the pieces of user unique data U(1) and U(2) sent from the scheduler 165 to the N-pieces of subcarriers. FIG. 17 is a diagram showing an example of the subcarrier mapping in the third embodiment.

According to the example of FIG. 17, the subcarrier mapping unit 22 performs the subcarrier mapping so that any one of the pieces of data D(1) through D(M) and the pieces of user unique data U(1) and U(2) is allocated to each frequency block (PRB). The method of determining how the data D and the data U are allocated in the third embodiment is, in the same way as in the second embodiment, that a bandwidth, which is half (½) of the transmitting bandwidth in the base station 10, is set as a receivable bandwidth of the mobile terminal, it is arbitrarily determined how the data D and the data U are allocated within the receivable bandwidth, and the information allocation within the total transmitting bandwidth is determined by repeating the allocation. The thus-generated modulation signals are sequentially output, and the N-pieces of modulation signals are transmitted to the IFFT unit 23 in the same symbol time.

Note that at this time, in the PRBs, to which the data D(1) through the data D(6) are allocated, the transmission rate is set to increase the transmission rate stepwise as in the first and second embodiments. Further, the pieces of user unique data U(1) and U(2) organizing the user unique information are the unique data such as the speech in voice, which is unique to the specified users different from each other. The pieces of user unique data U(1) and U(2) are structured not to simply contain the unique information for the fixed users but to contain the unique information for the plurality of users on a subframe-by-subframe basis in a way that switches over these pieces of unique information. The structure of the pieces of user unique data U(1) and U(2) is determined, based on the request information transmitted from the respective mobile terminals, by the scheduler 165 as described above.

<Mobile Terminal>

Figure 18:
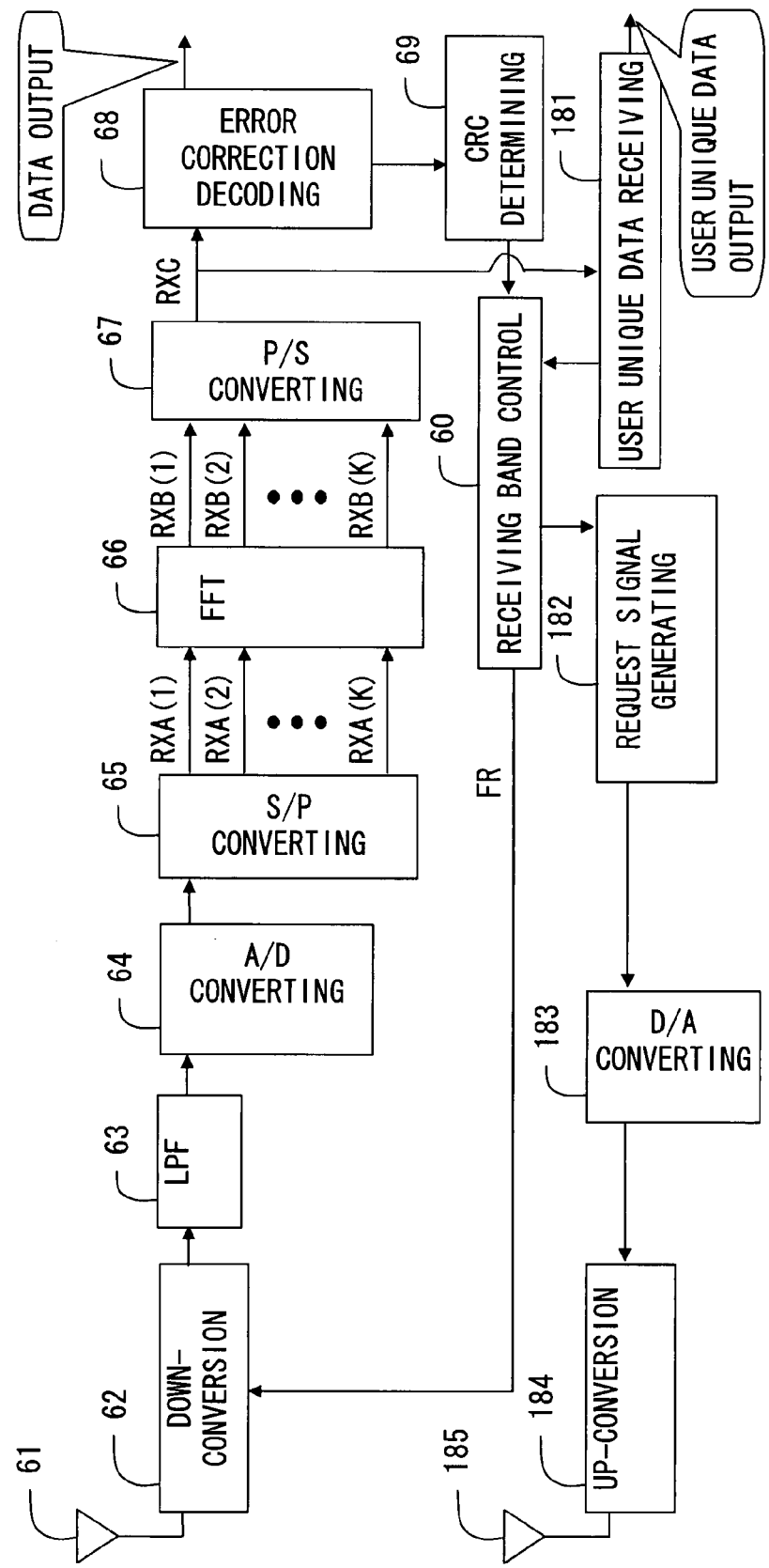
FIG. 18 is a block diagram showing a functional configuration of a mobile terminal 11 in the third embodiment.

The mobile terminal 11 in the third embodiment has further features about, in addition to those about the receiving function in the first embodiment, the transmitting function of processing the signal for transmitting the request information to the base station 10. With respect to only the function units different from those in the first embodiment, the functional configuration of the mobile terminal 11 in the third embodiment will be explained with reference to FIG. 18. FIG. 18 is a block diagram showing the functional configuration of the mobile terminal 11 in the third embodiment.

The mobile terminal 11 in the third embodiment further includes, in addition to the functional configuration in the first embodiment, a user unique data receiving unit 181, a request signal generating unit 182, a D/A converting unit 183, an up-conversion unit 184, a transmitting antenna 185, etc.

The user unique data receiving unit 181 receives the user unique data in the serial data string RXC output from the P/S converting unit 67. The use unique data is subjected to a predetermined process and transmitted to other function units. Moreover, the user unique data receiving unit 181 transfers, to the receiving band control unit 60, the information on the channel to which the user unique data is allocated. To be specific, in the example of FIG. 17, the information, specifying which channel, U(1) or U(2), the user unique data is received via, is transmitted to the receiving band control unit 60.

The receiving band control unit 60 in the third embodiment, unlike the first embodiment, determines the receiving central frequency FR on the basis of an error-occurrence determination result sent from the CRC determining unit 69, and also determines the user dedicated channel (U(1) or U(2)) to which the user unique data for the self-device should be allocated. The receiving central frequency FR is sent to the down-conversion unit 62, and the information on the user dedicated channel, to which the user unique data should be allocated, is sent to the request signal generating unit 182.

Figure 19:
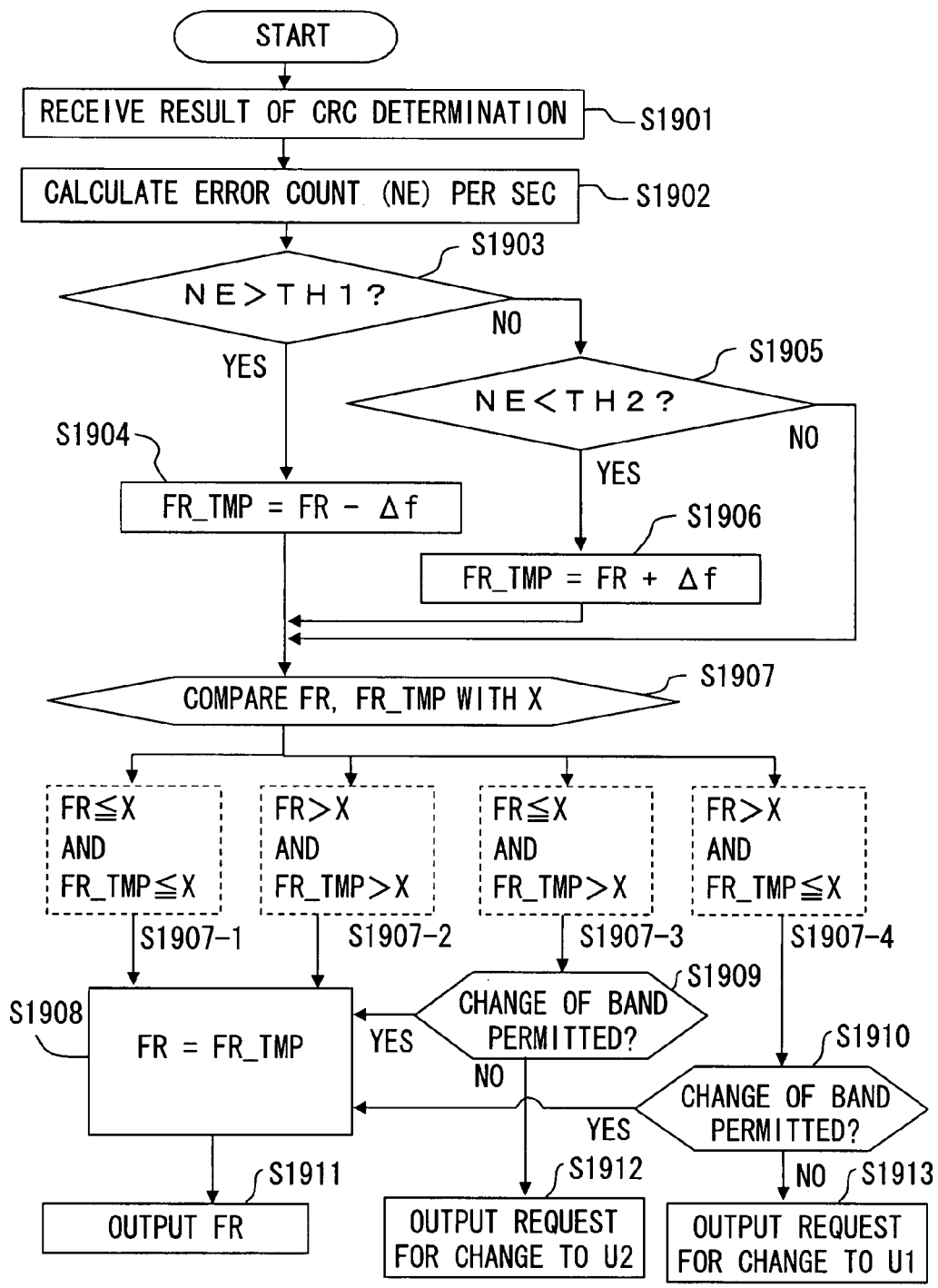
FIG. 19 is a flowchart showing a receiving segment and a user dedicated channel determining process of the receiving band control unit in the third embodiment.
Figure 20:
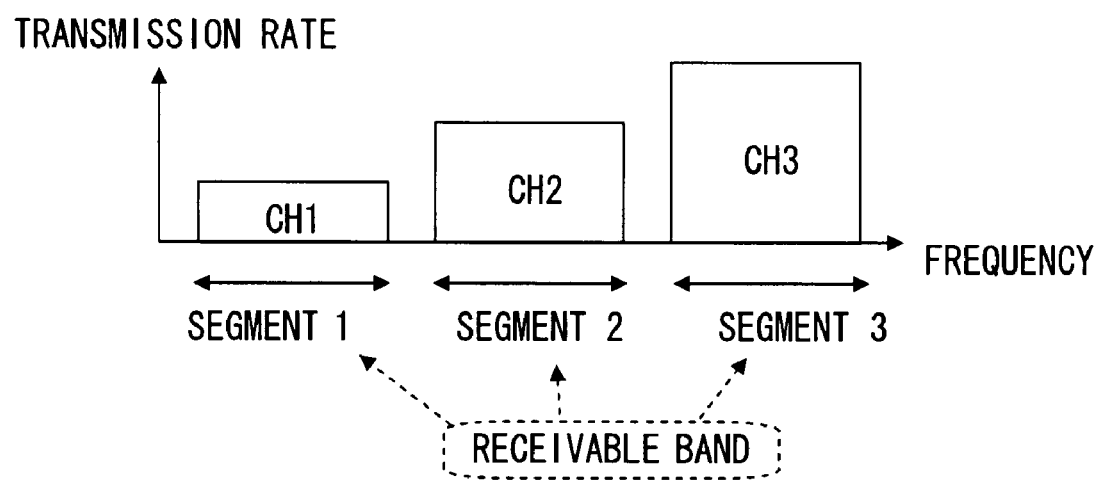
FIG. 20 is a diagram showing an example of a transmitting method in a related art.

The receiving band control unit 60 determines the information by the process as illustrated in FIG. 19. FIG. 19 is a flowchart showing the receiving segment of the receiving band control unit 60 and a user dedicated channel determining process. To begin with, the receiving band control unit 60 receives the result of the error-occurrence determination sent from the CRC determining unit 69 (S1901). Subsequently, the receiving band control unit 60 adds up the results of the error-occurrence determination, and calculates the error occurrence count NE per unit time (S1902). The predetermined unit time involves setting, e.g., 1 sec. as the time enabling a plurality of subframes to be included.

The receiving band control unit 60 compares the error occurrence count NE with the predetermined upper limit threshold value TH1 or the lower limit threshold value TH2 retained adjustably beforehand in the memory etc., thereby temporarily determining a receiving central frequency FR_TMP by the same method as in the first embodiment (S1903, S1904, S1905, S1906). A scheme in the third embodiment is not that the thus-determined receiving central frequency FR_TMP is transmitted in an as-is state to the down-conversion unit 62 but that it is determined by the following processes whether the receiving central frequency FR_TMP is transmitted eventually or not.

The receiving band control unit 60 respectively determines whether or not the receiving segment indicated by the present receiving central frequency FR (which will hereinafter be referred to as a receiving segment FR) includes the channel U(1) and whether or not the receiving segment indicated by the temporarily-determined receiving central frequency FR_TMP (which will hereinafter be referred to as a receiving segment FR_TMP) includes the channel U(1) (S1907). In FIG. 19, FR$\leq$X represents a case where the receiving segment FR includes the channel U(1), FR>X represents a case where the receiving segment FR does not include the channel U(1) (but includes the channel U(2)), FR_TMP$\leq$X represents a case where the receiving segment FR_TMP includes the channel U(1), and FR_TMP>X represents a case where the receiving segment FR_TMP does not include the channel U(1) (but includes the channel U(2)).

Based on this determination, if the receiving segment FR includes the channel U(1) and if the receiving segment FR_TMP includes the channel U(1) (S1907-1), the central frequency FR_TMP is determined as the receiving central frequency FR that should be updated (S1908), and the determined receiving central frequency FR is transmitted to the down-conversion unit 62 (S1911). Further, if the receiving segment FR includes the channel U(2) and if the receiving segment FR_TMP includes the channel U(2) (S1907-2), the operation is the same.

If the receiving segment FR includes the channel U(1) and if the receiving segment FR_TMP includes the channel U(2) (S1907-3), the receiving band control unit 60 checks whether a change-of-band request has already been transmitted and permission of the change is received or not (S1909). If the change-of-band permission is received (S1900; YES), the receiving band control unit 60 determines the receiving central frequency FR_TMP as the receiving central frequency FR that should be updated (S1908), and transmits the thus-determined receiving central frequency FR to the down-conversion unit 62 (S1911). Whereas if the change-of-band permission is not received (S1900; NO), the request signal generating unit 182 is notified of a purport that U(2) is the user dedicated channel to which the user unique data for the self-device should be allocated (S1912).

Further, if the receiving segment FR includes the channel U(2) and if the receiving segment FR_TMP includes the channel U(1) (S1907-4), the receiving band control unit 60 checks whether the change-of-band request has already been transmitted and the permission of the change is received or not (S1910). If the change-of-band permission is received (S1910; YES), the receiving band control unit 60 determines the receiving central frequency FR_TMP as the receiving central frequency FR that should be updated (S1908), and transmits it to the down-conversion unit 62 (S1911). Whereas if the change-of-band permission is not received (S1910; NO), the request signal generating unit 182 is notified of a purport that U(1) is the user dedicated channel to which the user unique data for the self-device should be allocated (S1913).

The request signal generating unit 182, when receiving the information on the user dedicated channel to which the user unique data should be allocated, generates a request signal containing this information. The generated request signal is converted into an analog signal by the D/A converting unit 183, further converted into a radio transmission frequency by the up-conversion unit 184, and transmitted from the transmitting antenna 185.

Operation and Effect in Third Embodiment

An operation and an effect of the OFDM communication system in the third embodiment discussed above will hereinafter be described. In the OFDM communication system in the third embodiment, the base station 10 transmits, to the mobile terminal 11, signals into which to multiplex the broadcast information of such a type that the same information is transmitted simultaneously to the plurality of mobile terminals and the user unique information containing such pieces of information transmitted to the respective mobile terminals as to be different from each other.

The base station 10 determines the channel allocation of the channels to which the broadcast information is allocated and the user dedicated channels so that each of the receiving segments, which can be taken by the mobile terminal 11, includes at least one of the user dedicated channels to which the user unique information should be allocated. Further, the allocation of each channel is determined within the receivable bandwidth on the frequency-block-by-frequency-block basis, and the plurality of channels is determined within the transmitting bandwidth so as to repeat the channel allocation within the receivable bandwidth.

Finally, the user individual information for the respective mobile terminals is classified and divided in accordance with the information on the user dedicated channels to which the user individual information, contained in the request signals transmitted from the mobile terminals, for the mobile terminals should be allocated, and the user individual data is mapped to the user dedicated channel requested of each mobile terminal.

The mobile terminal 11, when receiving the multiplexed signals of the broadcast information and the user unique information, estimates the receiving environment in accordance with the received signals, and determines the receiving segment and the user dedicated channel, to which the user individual information for this mobile terminal should be allocated, corresponding to the receiving environment.

At this time, when selecting the receiving segment to enable the signals to be received at an optimal transmission rate corresponding to the receiving environment, the selected receiving segment invariably needs including the user dedicated channel to which the user unique information for the user is allocated. If done so, the adjustable range of the transmission rate in the mobile terminal is limited due to the multiplexing of the user unique information, so that the user dedicated channel is invariably allocated to the selectable receiving segment, and the mobile terminal notifies the base station 10 of the user dedicated channel included in the former selected receiving segment.

<Others>

The disclosures of Japanese patent application No. JP2006-252964, filed on Sep. 19, 2006 including the specification, drawings and abstract are incorporated herein by reference.

What is claimed is:

1. A transmitting device comprising:
a processor configured to:
divide a transmitting frequency bandwidth into a plurality of frequency blocks by grouping a plurality of subcarriers included in the transmitting frequency bandwidth into the plurality of frequency blocks each having a predetermined number of subcarriers, wherein each of the plurality of frequency blocks is narrower than a receivable frequency segment, which has a receivable bandwidth, in a receiving device, and
set a transmission rate in each of more than two frequency blocks, to which a data with respect to predetermined information is allocated, of the plurality of frequency blocks so as to increase or decrease stepwise on a frequency axis; and
allocate the data with respect to the predetermined information to the more than two frequency blocks so that, when the receivable frequency segment in the receiving device moves on the frequency axis of the transmitting frequency bandwidth frequency block by frequency block, the predetermined information, which is received in the more than two frequency blocks in the receivable frequency segment after moving, has different level-of-detail from that of the predetermined information, which is received in the more than two frequency blocks in the receivable frequency segment before moving.

2. The transmitting device according to claim 1, wherein the processor is configured to generate the data with respect to the predetermined information so as to be plural data having different levels-of-detail, and
to allocate, in a condition that the transmitting frequency bandwidth is divided by the receivable bandwidth into a plurality of frequency domains, the data with respect to the generated predetermined information to each of the frequency domains, wherein the data has the lowest level-of-detail.

3. The transmitting device according to claim 2, wherein the plural data having the different levels-of-detail include additional information for increasing the level-of-detail of the predetermined information and include related information to the predetermined information.

4. The transmitting device according to claim 2, wherein the processor is configured to generate, when the predetermined information is voice information, values, each obtained by combining value of each of bits digits of digital value into which the voice information is quantized with a predetermined bit count at respective sampling points for a predetermined sample count, as the plural data having the different levels-of-detail.

5. The transmitting device according to claim 2, wherein the processor is configured to allocate the data with respect to the generated predetermined information to the frequency blocks, in the order from a lower transmission rate successively from the data having the lowest level-of-detail, and
to allocate the data with respect to the predetermined information to the more than two frequency blocks so that the data with respect to the predetermined information, wherein the data is received in the frequency block having the highest transmission rate in the receivable frequency segment, includes the data with respect to the predetermined information, wherein the data is received in the frequency block having the lowest transmission rate in a closest receivable frequency segment to the receivable frequency segment, wherein the closest receivable frequency segment has lower transmission rate than the transmission rate in the receivable frequency segment.

6. The transmitting device according to claim 1, wherein the processor is configured to allocate data with respect to different types of information from the predetermined information to the plurality of frequency blocks except the more than two frequency blocks, and
to decide, in a condition that the transmitting frequency bandwidth is divided by the receivable bandwidth into a plurality of frequency domains, data allocation so that an allocation of the data with respect to the predetermined information, and the data with respect to different types of information from the predetermined information forms repeated pattern in each of the frequency domains.

7. The transmitting device according to claim 6, the processor is configured to decide data allocation to each of the frequency blocks so that, when the receivable frequency segment moves on a frequency axis of the transmitting frequency bandwidth frequency block by frequency block, information received in any one of the frequency blocks in the receivable frequency segment after moving has different level-of-detail from that of the information received in any one of the frequency blocks in the receivable frequency segment before moving.

8. The transmitting device according to claim 7, wherein the data with respect to the different types of information from the predetermined information include user unique information and
the processor is configured to allocate data of the user unique information for the receiving device to the frequency block to which a user dedicated channel for transmitting the user unique information within the receivable frequency segment selected by the receiving device is allocated, of the plurality of receivable frequency segments based on a request signal given from the receiving device.

* * * * *